(12) United States Patent
Buer et al.

(10) Patent No.: US 12,537,575 B2
(45) Date of Patent: Jan. 27, 2026

(54) TECHNIQUES FOR END-TO-END BEAMFORMING WITH MULTIPLE AREAS OF SIMULTANEOUS USER COVERAGE

(71) Applicant: ViaSat, Inc., Carlsbad, CA (US)

(72) Inventors: Kenneth V. Buer, Bluff City, TN (US); James E. Petranovich, La Jolla, CA (US)

(73) Assignee: Viasat, Inc., Carlsbad, CA (US)

( * ) Notice: Subject to any disclaimer, the term of this patent is extended or adjusted under 35 U.S.C. 154(b) by 309 days.

(21) Appl. No.: 18/553,873

(22) PCT Filed: Mar. 10, 2022

(86) PCT No.: PCT/US2022/019835
§ 371 (c)(1),
(2) Date: Oct. 4, 2023

(87) PCT Pub. No.: WO2022/216410
PCT Pub. Date: Oct. 13, 2022

(65) Prior Publication Data
US 2024/0235634 A1 Jul. 11, 2024

Related U.S. Application Data

(60) Provisional application No. 63/173,065, filed on Apr. 9, 2021.

(51) Int. Cl.
*H04B 7/06* (2006.01)
*H04B 7/185* (2006.01)
*H04W 84/06* (2009.01)

(52) U.S. Cl.
CPC ....... *H04B 7/0617* (2013.01); *H04B 7/18539* (2013.01); *H04W 84/06* (2013.01)

(58) Field of Classification Search
CPC .. H04B 7/0617; H04B 7/18539; H04W 84/06
See application file for complete search history.

(56) References Cited

U.S. PATENT DOCUMENTS

| 8,923,756 B1 | 12/2014 | Freedman et al. |
| 2007/0281612 A1 | 12/2007 | Benjamin et al. |

(Continued)

FOREIGN PATENT DOCUMENTS

| EP | 3529917 B1 | 12/2020 |
| RU | 2388161 C2 | 4/2010 |
| RU | 2741489 C1 | 1/2021 |

OTHER PUBLICATIONS

PCT Search Report and Written Opinion for App No. PCT/US2022/019835, Jun. 17, 2022, 13 pages.

*Primary Examiner* — Blake J Rubin
(74) *Attorney, Agent, or Firm* — Murphy, Bilak & Homiller, PLLC

(57) ABSTRACT

A satellite communications system and method of operation provides service to pluralities of user terminals in multiple non-overlapping user coverage areas, based on performing ground-based, end-to-end beamforming simultaneously with respect to the multiple user coverage areas. A satellite communications system and method of operation provides service to pluralities of user terminals in multiple non-overlapping user coverage areas, based on performing ground-based, end-to-end beamforming simultaneously with respect to the multiple user coverage areas. The system provides a number of simultaneous beams in the forward or reverse directions and controlling the allocation of beams to respective user coverage areas determines the capacity allocations for the respective user coverage areas. A multiplicity of transmit/receive paths onboard a satellite in the system supports the end-to-end beamforming and controlling the (Continued)

beam allocations is based on controlling the allocation of such paths to the respective user coverage areas.

14 Claims, 9 Drawing Sheets

(56) References Cited

U.S. PATENT DOCUMENTS

| | | |
|---|---|---|
| 2012/0307720 A1 | 12/2012 | Madsen et al. |
| 2014/0065950 A1 | 3/2014 | Mendelsohn et al. |
| 2020/0028574 A1 | 1/2020 | Mendelsohn et al. |
| 2020/0119811 A1 | 4/2020 | Kay et al. |
| 2020/0274611 A1 | 8/2020 | Mendelsohn et al. |
| 2020/0304201 A1 | 9/2020 | Buer et al. |

TECHNIQUES FOR END-TO-END BEAMFORMING WITH MULTIPLE AREAS OF SIMULTANEOUS USER COVERAGE

TECHNICAL FIELD

Disclosed techniques use end-to-end beamforming for simultaneous beamforming via an end-to-end relay, such as a satellite, into non-overlapping geographic coverage areas.

BACKGROUND

Wireless communications systems, such as satellite communications systems, provide a means by which information, including audio, video, and various other sorts of data, may be communicated from one location to another using a communications satellite. Communications satellites typically include one or more antenna assemblies for communicating with various terrestrial target devices, which may include ground-based access node terminals or user terminals, any of which may be stationary (e.g., installed at a permanent installation site, moved from one fixed installation site to another, etc.) or mobile (e.g., installed at a vehicle, a boat, a plane, handheld etc.).

One or more antenna assemblies of a communications satellite may be configured for transmitting downlink signals (e.g., forward link signals to user terminals or return link signals to access nodes) and/or receiving uplink signals (e.g., forward link signals from access nodes or return link signals from user terminals). The antenna assembly or assemblies may be associated with a service coverage area within which devices may be provided communications services via the antenna assembly.

In some cases, a communications satellite may be a geostationary satellite, in which case the communications satellite's orbit may be synchronized with the rotation of the Earth to maintain the service coverage area to be essentially stationary with respect to the Earth. In other cases, the communications satellite may use a different orbit (e.g., about the Earth) that causes the service coverage area to move over the surface of the Earth as the communications satellite traverses its orbital path.

Some communications satellites may place spot beam coverage areas in fixed locations. However, these communications satellites may not have the ability to move the spot beams to accommodate changes to a service coverage area. Moreover, such satellite communications architectures essentially provide uniformly distributed capacity over the service coverage area. Capacity per spot beam, for example, is strongly related to the allocated bandwidth per spot beam, which may be predetermined for every spot beam and thus allow for little to no flexibility or configurability.

Although these satellite communications architectures may be valuable when a desired service coverage area is well-known and the demand for capacity is uniformly distributed over the service coverage area, the inflexibility of the aforementioned architectures may be limiting for certain applications. For example, a communications satellite may be re-tasked or deployment conditions (e.g., orbital slot, etc.) may change. Additionally, satellite communications services may see changes in user demands (e.g., fixed vs. mobile users, etc.).

Although signal processing techniques such as beamforming provide some ability to adapt the arrangement of spot beams or service coverage area, additional flexibility in adaptation of service coverage area and spot beam arrangement may be desired. For example, it may be desirable for a satellite communications system and, correspondingly, a communications satellite to flexibly and dynamically adjust locations and sizes of service coverage areas based on factors such as locations of user terminals and access node terminals, a spatial distribution of the communications service capacity, and a capacity allocation of the communications service. Additionally, it may be desirable for a satellite communications system and, correspondingly, a communications satellite to flexibly and dynamically allocate communications resources between different service coverage areas, for example, to shift higher throughput services to different coverage areas based on dynamically changing conditions.

SUMMARY

Methods, systems, and devices are described for end-to-end beamforming with multiple areas of simultaneous user coverage.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
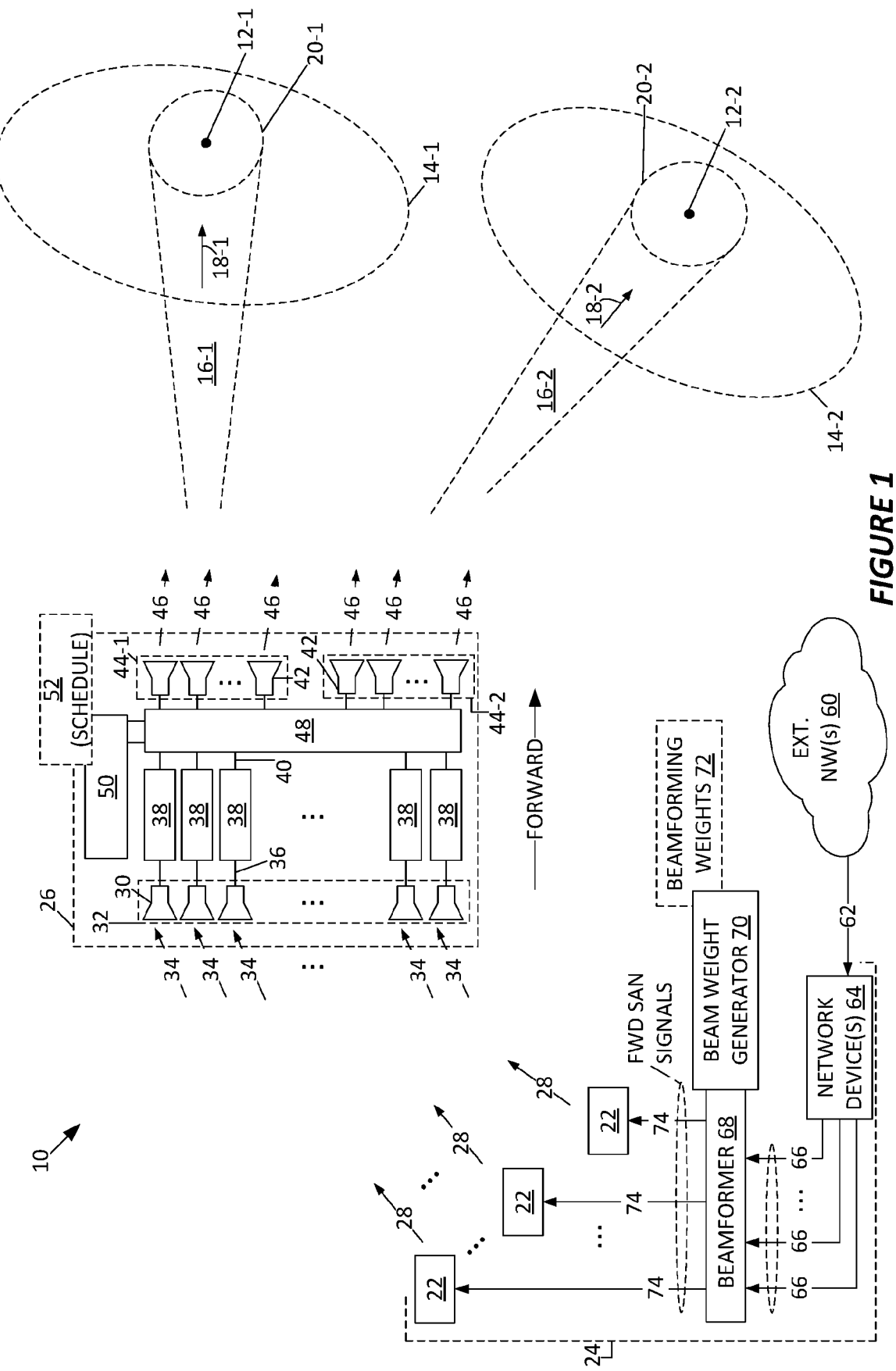
FIG. 1 illustrates a satellite communications system that supports end-to-end beamforming with multiple areas of simultaneous user coverage in accordance with aspects of the present disclosure.

A satellite communications system 10 ("system") as depicted in FIG. 1 provides service to pluralities of user terminals 12 in multiple non-overlapping user coverage areas 14, e.g., first and second user coverage areas 14-1 and 14-2, based on performing ground-based, end-to-end beamforming simultaneously with respect to the multiple user coverage areas 14. Hereafter, unless otherwise noted or apparent from the context, the term "beamforming" refers to ground-based, end-to-end beamforming and suffixed reference numbers are discussed only where clarity requires the inclusion of suffixes.

FIG. 1 highlights details for beamforming in the forward direction—towards the user terminals 12—and relies on several simplifications to ease discussion and maintain clarity. Chief among the simplifications is the depiction of a single user terminal 12-1 in the first user coverage area 14-1 and a single user terminal 12-2 in the second user coverage area 14-2, with a corresponding forward beam 16-1 serving the first user terminal 12-1 and a corresponding forward beam 16-2 serving the second user terminal 12-2. "Serving" connotes the fact that the forward user signal(s) 18-1 intended for the user terminal 12-1 are conveyed in the forward beam 16-1. Similarly, the forward beam 16-2 conveys forward user signals 18-2 intended for the user terminal 12-2.

Operation of the system 10 involves forming potentially many forward beams 16 in the first user coverage area 14-1 and in the second user coverage area 14-2, simultaneously. Each forward beam 16 serves one or more user terminals 12, e.g., each forward beam 16 serves multiple user terminals 12 that are "clustered" in the sense that they are all within the same beam coverage area 20. FIG. 1 depicts example the beam coverage area 20-1 as the terrestrial "footprint" of the forward beam 16-1 and the beam coverage area 20-2 as the terrestrial footprint of the forward beam 16-2. User terminals 12 within the footprint of the forward beam 16-1 may be served by that beam and, likewise, user terminals 12 within the footprint of the forward beam 16-2 may be served by that beam.

Consider an example approach where, from a system design perspective, each user coverage area 14 is logically divided into a plurality of beam coverage areas 20—i.e., a predetermined pattern of beam coverage areas 20 that is based on known or expected sizes of beam footprints 20 and provides for forward coverage over the entire user coverage area 14. Serving the user coverage area 14 does not require simultaneously forming as many forward beams 16 as there are predefined beam coverage areas 20. Instead, a time-division multiplexing (TDM) pattern may be used, wherein a smaller number of forward beams 16 is used to illuminate different subsets of the predefined beam coverage areas 20 at different times.

Forming any given forward beam 16 to illuminate a particular geographic area—i.e., forming a forward beam 16 whose beam coverage area 20 is located where desired within the overall user coverage area 14—requires having channel estimates describing the transmission channel from each access node 22 participating in the beamforming to a receiver that is located at or near the geographic center of the desired beam center. Beamforming requires use of a plurality of geographically distributed access nodes 22, which form part of the ground segment 24 of the system 10.

In practice, for each forward beam 16 formed, the system 10 obtains channel estimates with respect to a user terminal 12 that is served by that forward beam 16 and is at or reasonably near the geographic location designated as the beam center. Such a user terminal 12 may be referred to as a reference user terminal (RUT) or a designated user terminal (DUT). Thus, for a given cluster of user terminals 12 all being served by the same forward beam 16, a centrally located one of them serves as the RUT for estimating the end-to-end channels used to form the forward beam 16. Particularly, the satellite communications system 10 uses channel "sounding" with respect to the RUT associated with each forward beam 16, to determine the end-to-end channel from each access node 22 to the RUT. "Sounding" refers to the transmission of known reference signals for use in estimating the channel between the RUT and each access node 22. Sounding may be performed periodically, e.g., to adapt the beamforming weights responsive to changing atmospheric conditions.

Each channel between the RUT and a respective one of the access nodes 22 is a multi-path channel, wherein a satellite 26 of the system 10 acts as an end-to-end relay between the ground segment 24 and the user terminals 12. Here, inducement of multi-path is intentional and arises based on there being multiple forward signal paths through the satellite 26 with respect to each access node 22. To understand the induced multipath, consider that each access node 22 transmits a forward uplink signal 28 that is received by some or all the feeds 30 of a feeder link array 32 onboard the satellite 26. The feeder link array 32 may be referred to as a feeder link antenna subsystem, with the individual feeds 30 being referred to as feeder-link constituent elements that are configured to illuminate the access node areas to receive a plurality of composite input forward signals.

Each feed 30 receives a superposition of the forward uplink signals 28—i.e., a superposition signal 34 comprised of the individual forward uplink signals 28 from two or more of the access nodes 22. The superposition signal 34 at each feed 30 is unique and depends on the channels between the feed 30 and individual ones of the access nodes 22, which also may be referred to as "satellite access nodes" or SANs. The superposition signals 34 may also be referred to as composite input forward signals.

Each feed 30 thus receives a composite input forward signal 34 and provides it as a received composite input forward signal 36 that is applied to the input end of a transponder 38 onboard the satellite 26. Each transponder 38 may be regarded as a signal pathway within the satellite 26 for conveying a respective one of the receive composite input forward signals 36. The number of feeds 30 may be large, e.g., five-hundred or more, and the satellite 26 includes a transponder 38 for each feed 30. There may be additional, spare transponders 38 onboard, too, as substitutes for malfunctioning transponders 38.

Each transponder 38 provides a non-processed signal path, meaning that it does not perform signal demodulation and re-modulation with respect to the composite input forward signal 36. However, the transponders 38 in one or more embodiments include filters, amplifiers, and frequency shifters, to shift from uplink frequencies to downlink frequencies. Such operations convert the received composite input forward signal 36 input into each transponder 38 into a corresponding forward composite downlink signal 40 that is transmitted from a corresponding feed 42 either in a first user link feed array 44-1 or a second user link feed array 44-2, as a transmitted forward composite downlink signal 46. The first user link feed array 44-1 serves the first user coverage area 14-1 and the second user link feed array 44-2 serves the second user coverage area 14-2.

Controlling the number of forward beams 16 allocated to the first user coverage area 14-1 and the number of forward beams 16 allocated to the second user coverage area 14-2 is a function of controlling transponder connectivity within the satellite 26—i.e., controlling how many of the transponders 38 are allocated to the first user link feed array 44-1 and how many of the transponders 38 are allocated to the second user link feed array 44-2. To appreciate this arrangement, consider simultaneously forming a total of K forward beams 16, based on M access nodes 22 cooperating in the beamforming, with N feeds 30 in the feeder link array 32, N transponders 38 onboard the satellite 26, and up to N feeds 42 in each of the user link feed arrays 44-1 and 44-2. As a non-limiting example, K equals 512, and M equals N equals K. Assume that each user link feed array 44-1 or 44-2 includes N feeds 42 and that switching circuitry 48 onboard the satellite 26 is operative to switch the output ends of every transponder 38 either to the first user link feed array 44-1 or the second user link feed array 44-2.

Switching the output ends of all N transponders 38 to respective ones of the N feeds 42 in the first user link feed array 44-1 can be understood as allocating all K forward beams 16 to the first user coverage area 14-1, switching the output ends of all N transponders 38 to respective ones of the N feeds 42 in the second user feed link array 44-2 allocates all K forward beams 16 to the second user coverage area 14-2. Switching the output ends of R ones among the N transponders 38 to respective ones of the N feeds 42 in the first user feed link array 44-1 and the output allocates R forward beams 16 to the first user coverage area 14-1, leaving (N−R) ones among the N transponders 38 allocable for forming (N−R) forward beams 16 for the second user coverage area 14-2.

In one or more embodiments, each of the first and second user link feed arrays 44-1 includes fewer feeds 42 than there are feeds 30 included in the feeder link array 32. As a non-limiting example, there are 512 feeds 30 in the feeder link array 32, and there are 358 feeds 42 in the first user link feed array 44-1 and another 358 feeds 42 in the second user link feed array 44-2. Such an arrangement allows up to seventy percent (358/512) of the forward capacity to be allocated either to the first user coverage area 14-1 or to the second user coverage area 14-2, at any one time. That is up to 358 of the feeds 30 and corresponding transponders 38 can be connected either to the first user coverage area 14-1 or the second user coverage area 14-2 at any given time. Of course, the satellite 26 may alter the capacity allocation across time slots or other scheduling intervals, and the seventy-percent example is non-limiting.

Maximum allocation flexibility arises in embodiments where every transponder 38 can be allocated either to the first user link feed array 44-1 or to the second user link feed array 44-2. Flexibility comes at the expense of additional switching or splitting circuitry and the number of transponders 38 that are dynamically allocable may be fewer than all.

In at least one embodiment, each user link feed array 44-1 and 44-2 includes more than N/2 feeds 42, allowing more than half of the N transponders 38 to be allocated to a respective one of the user coverage areas 14-1 or 14-2 at any given time. For example, each user link feed array 44 includes 2N/3 feeds 42, thus allowing up to two-thirds of the transponders 38 to be allocated to a selected one of the user link feed arrays 44-1 or 44-2. In practice, the number of feeds 42 included in each user link feed array 44 need not be the same among all user link feed arrays 44, but the number of feeds 42 included in each user link feed array 44 puts an upper limit on the number of forward beams 16 allocable to the user coverage area 14 served by that user link feed array 44.

The switching circuitry 48 operates as a "selector subsystem" and determines which ones and how many of the transponders 38 are switchable between the first and second user link feed arrays 44-1 and 44-2. For example, it controls connectivity (allocation) of the transponders 38 responsive to control signals output from the control circuitry 50. In turn the control circuitry 50 includes or is associated with storage 52, e.g., one or more types of memory circuits, which stores a schedule that is used to control the dynamic allocation of capacity between the user coverage areas 14, e.g., between a first user coverage area 14-1 and a second user coverage area 14-2. The schedule may be dynamically decided or updated, e.g., based on uploaded control information determined by the ground segment 24 in dependence on prevailing conditions, such as differing capacity needs among the user coverage areas 14.

"Capacity" allocation in the forward direction refers to how the total number of forward beams 16 are split—allocated—between the respective user coverage areas 14. In one or more embodiments, respective subsets of the transponders 38 may be dedicated to corresponding ones of the user coverage areas 14 while other ones among the overall set of transponders 38 are dynamically switchable between the user coverage areas 14, to account for changing capacity needs in the respective service areas.

To further understand beamforming according to the above details, consider user data streams 62 incoming to the ground segment 24 of the satellite communications system 10 from one or more external networks 60. Example external networks include any one or more of the Internet or other Packet Data Network (PDN), Public Land Mobile Networks (PLMNs), the Public Switched Telephone Network (PSTN), etc. Each user data stream 62 targets a respective user terminal 12 in one of the user coverage areas 14 served by the satellite 26. One or more network devices 64 included in the ground segment 24 receive the user data streams 62 and, for each user data stream 62, determine the targeted user terminal 12 and determine the forward beam 16 used to serve the targeted user terminal 12. The user data streams 62 that are assigned to the same forward beam 16 are used to form a corresponding forward beam signal 66.

The plurality of forward beam signals 66 are provided to a beamformer 68 included in the ground segment 24. A beam weight generator 70 generates beamforming weights 72 and the beamformer 68 uses the beamforming weights 72 to generate corresponding forward access-node signals 74 for transmission by the respective access nodes 22 cooperating in the beamforming as forward uplink signals 28. The forward access-node signals 74 are synchronized to support the end-to-end beamforming process.

The beamforming weights 72 are based on the end-to-end channels determined between each access node 22 and the RUT associated with each forward beam 16. That is, the beamforming weights 72 account for the end-to-end channels from each access node 22 to each RUT, including, the uplink channels from each access node 22 to each of the feeds 30 in the feeder link array 32, the multipath channels through the satellite 26, and the downlink channels from each of the feeds 42 in the user link feed arrays 44 to the RUT.

As a detailed example based on there being M access nodes 22 and K forward beams 16, the beamformer 68 duplicates each of the K forward beam signals 66 into M groups of K forward beam signals 66. The beamformer 68 includes a forward weighting and summing module (not shown) for each of the M access nodes, and each such module receives one of the M groups of K forward beam signals 66. The beam weight generator 70 generates an M×K forward beam weight matrix, based on a channel matrix that estimates the end-to-end forward gains for each of the K×M end-to-end forward multipath channels.

The first weighting and summing module within the beamformer 68 applies a weight equal to the value of the 1,1 element of the M×K forward beam weight matrix to the first of the K forward beam signals 66. A weight equal to the value of the 1,2 element of the M×K forward beam weight matrix is applied to the second of the K forward beam signals 66. The other weights of the matrix are applied in like fashion, on through the Kth forward beam signal 66, which is weighted with the value equal to the 1, K element of the M×K forward beam weight matrix. Each of the K weighted forward beam signals 66 are then summed and output from the first weighting and summing module as a corresponding one of the forward access-node signals 74 depicted in FIG. 1. The forward access-node signal 74 output by the first weighting and summing module may be time adjusted for synchronization of transmission across the plurality of access nodes 22. Similarly, each of the other weighting and summing modules in the beamformer 68 (not shown) receive their respective set of duplicated K forward beam signals 66, and weight and sum that using the corresponding elements of the M×K forward beam weight matrix. The outputs from each of the M weighting and summing modules may be adjusted for timing, e.g., delay, and jitter, as part of forming/providing the forward access-node signals 74.

As a consequence of the beam weights applied by the beamformer 68 at the ground segment 24, the forward uplink signals 28 that are transmitted from the access nodes 22 to/through the satellite 26 form forward beams 16. The satellite 26 functions as an end-to-end relay in this beamforming context. The size and location of the forward beams 16 that are formed may be a function of the number of access nodes 22 that are deployed, the number and antenna patterns of relay antenna elements—feeds 30 and 42—that the signals pass through, the location of the satellite 26, and/or the geographic spacing of the access nodes 22.

Figure 2:
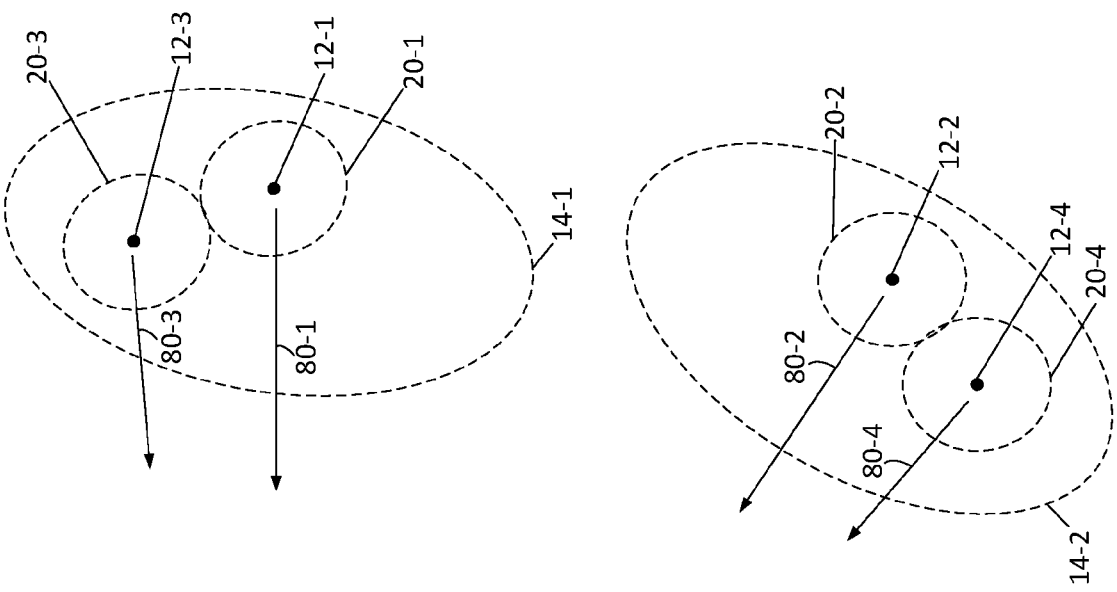
FIG. 2 illustrates a satellite communications system configuration that supports end-to-end beamforming with multiple areas of simultaneous user coverage in accordance with aspects of the present disclosure.
Figure 2:
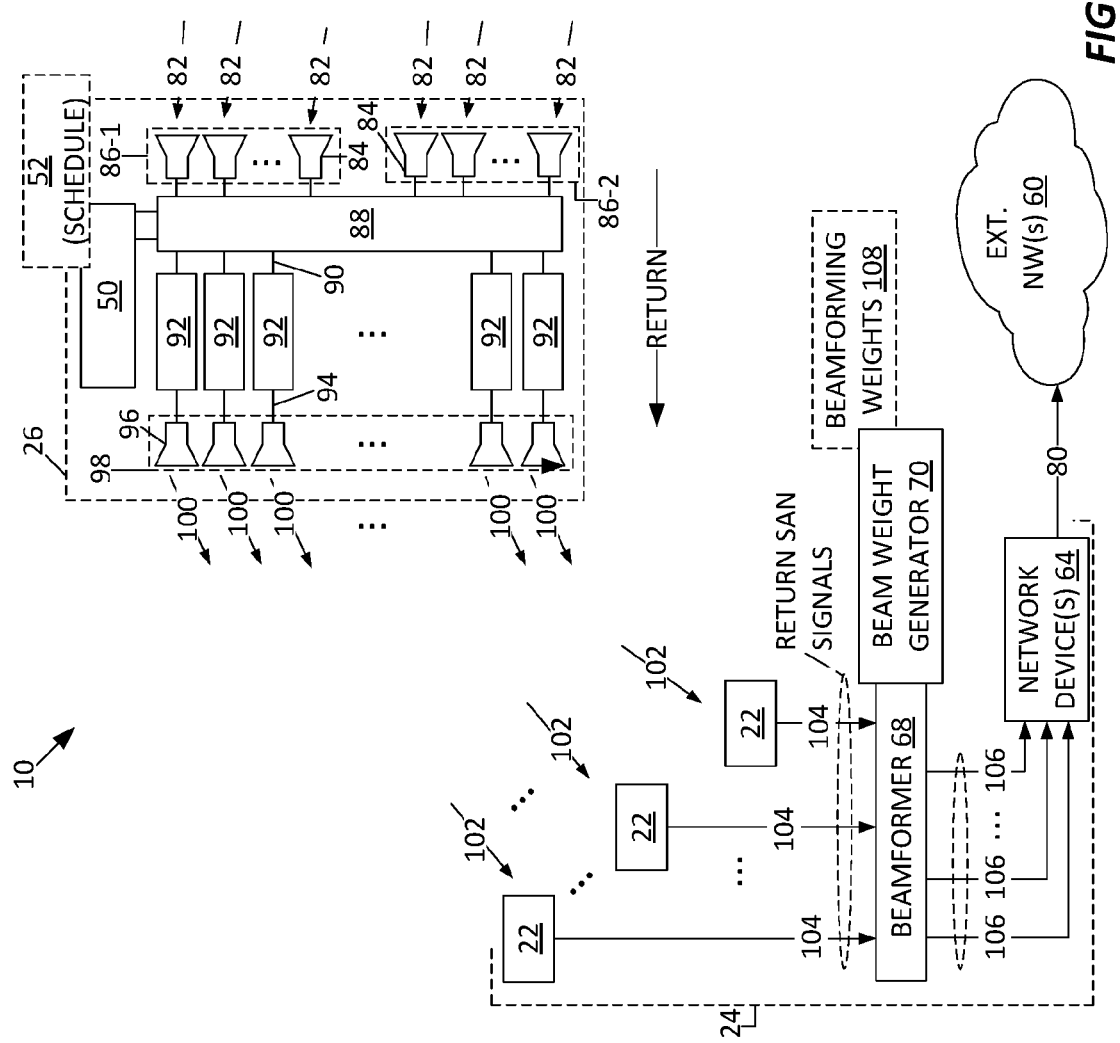

FIG. 2 illustrates beamforming in the return direction, i.e., from the user terminals 12 towards the access nodes 22. The return user beams—not shown in the diagram—are formed digitally within the ground segment 24, rather than in free space. The return beamforming provides isolation or interference reduction between the uplink signals transmitted by user terminals 12 located in adjacent beam coverage areas 20.

Consider an example case where a user terminal 12-1 in a beam coverage area 20-1 of the first user coverage area 14-1 transmits an uplink signal 80-1, e.g., an uplink signal containing user data destined for the external network(s) 60. At the same time, a user terminal 12-3 in an adjacent beam coverage area 20-3 within the first user coverage area 14-1 transmits an uplink signal 80-3. Similarly, a user terminal 12-2 in a beam coverage area 20-2 of the second user coverage area 14-2 transmits an uplink signal 80-2, e.g., an uplink signal containing user data destined for the external network(s) 60. At the same time, a user terminal 12-4 in an adjacent beam coverage area 20-4 within the second overall user coverage area 14-2 transmits an uplink signal 80-4. Beamforming in the return direction reduces interference between such signals, which facilitates frequency reuse over the respective beam coverage areas 20.

To understand return beamforming, consider that each feed 84 in a first user link feed array 86-1 receives a superposition signal 82 that is a unique superposition of the uplink signals 80 being transmitted by user terminals 12 in the corresponding user coverage area 14-1. Similarly, each feed 84 in a second user link feed array 86-2 receives a superposition signal 82 that is a unique superposition of the uplink signals 80 being transmitted by user terminals 12 in the corresponding user coverage area 14-2. The same holds true for respective additional user coverage areas 14, to the extent that there are further user coverage areas 14.

Each feed 82 outputs a return composite return uplink signal 90 that is switched into a respective one of the transponders 92 by switching circuitry 88. As with beamforming in the forward direction, the number of transponders 92 allocated to the first user link feed array 86-1 versus the number of transponders 92 allocated to the second user link feed array 86-2 determines how many of the return beams are allocated to the first user coverage area 14-1 versus the second user coverage area 14-2. In one or more embodiments, the configuration and allocation of return beams (not shown) matches that of the forward beams 16.

Each transponder 92 outputs a return composite return downlink signal 94 that is transmitted from a corresponding feed 96 in a feeder link antenna subsystem 98. The transmitted version of each return composite return downlink signal 94 is shown in the diagram as a transmitted signal 100. Correspondingly, each access node 22 receives a superposition signal 102 that is a unique superposition of the transmitted signals 100 and provides a corresponding return composite signal 104 to the beamformer 68. The return composite signals 104 may be time synchronized for coherence, and the beamformer 68 applies beamforming weights 108 to form the return beams in the digital domain, represented by return beam signals 106.

The beamforming weights 108 comprise a K×M return beam weight matrix that is based on information stored in a channel data store, which is populated by a channel estimator implemented in the beamformer 68 or in association with it. Derivation of the beamforming weights 108 in the beam weight generator 70 relies on channel estimates, e.g., end-to-end channel estimates based on return-link signals transmitted from the RUTs in the respective user coverage areas 14. These return-link end-to-end-channel estimates account for the multipath return-link channels between each RUT and each access node 22.

For return beamforming, the beamformer 68 has a beam weights input through which it receives the return beam weight matrix—the beamforming weights 108—from the beam weight generator 70. Each of the return composite signals 104 is coupled to an associated one of M splitter and weighting modules (not shown) within the beamformer 68.

Each splitter and weighting module splits the time-aligned return composite signal 104 into K copies. Each splitter and weighting module weights each of the K copies using the k, m element of the K×M return beam weight matrix. Each set of K weighted composite return signals is then coupled to a combining module—not shown—that combines the kth weighted composite return signal output from each splitter and weighting module, to output the kth return beam signal 106. Each of the K return beam signals 106 includes communication-signal samples from all user terminals 12 that are active in the corresponding beam coverage area.

With the above example details in mind, a satellite communications system 10 comprising a satellite 26 for providing communications between a plurality of access nodes 22 and a plurality of user terminals 12. The plurality of access nodes 22 is geographically distributed within a corresponding access node area, and the plurality of user terminals 12 is geographically distributed within a first user coverage area 14-1 and a second user coverage area 14-2. In other words, some of the user terminals 12 are distributed within the first user coverage area 14-1 and some of the user terminals 12 are distributed within the second user coverage area 14-2.

Onboard the satellite 26, the feeder link array 32 may be referred to as a feeder link antenna subsystem 32, with the feeds 30 referred to as a plurality of feeder link constituent elements 30 of the feeder link antenna subsystem 32. Each feeder link constituent element 30 is configured to illuminate the access node area to receive a unique superposition of the plurality of forward uplink signals 28 from the plurality of access nodes 22 as a composite input forward signal 34.

The transponders 38 may be referred to as forward signal paths 38 and the satellite 26 provides a plurality of forward signal paths 38. Each of the plurality of forward signal paths 38 has a respective input coupled with a respective one of the plurality of feeder link constituent elements 30 to obtain a respective one of the plurality of composite input forward signals 34, as a received composite input forward input signal 36. Each forward signal path 38 correspondingly provides a respective one of a plurality of forward composite downlink signals 40 at a respective output.

The first user link array 44-1 of the satellite 26 may be referred to a first user link antenna subsystem 44-1, and the feeds 42 of the first user link antenna subsystem 44-1 may be referred to as first user link constituent elements 42 and they are configured to illuminate the first user coverage area 14-1. Similarly, the second user link array 44-2 of the satellite 26 may be referred to as second user link antenna subsystem 44-2, and the feeds 42 of the second user link antenna subsystem 44-2 may be referred to as second user link constituent elements 42, which are configured to illuminate the second user coverage area 14-2. The second user coverage area 14-2 is non-overlapping with the first user coverage area 14-1.

The switching circuitry 48 may comprise a switch matrix with full cross-switching connectivity between any switch-matrix input and any switch-matrix output, and it may be referred to as a selector subsystem 48. The selector subsystem 48 is reconfigurable in response to control signals to dynamically allocate the plurality of forward signal paths 38 among the first user link antenna subsystem 44-1 and the second user link antenna subsystem 44-2. Particularly, in a first configuration of the selector subsystem 48, the respective outputs of a first subset of the plurality of forward signal paths 38 are selectively coupled with respective ones of a first subset of the plurality of first user link constituent elements 42 and the respective outputs of a second subset of the plurality of forward signal paths 38 are selectively coupled with respective ones of a first subset of the plurality of second user link constituent elements 42.

In a second configuration of the selector subsystem 48, a third subset of the plurality of forward signal paths 38 has respective outputs coupled with respective ones of a second subset of the plurality of first user link constituent elements 42 and a fourth subset of the plurality of forward signal paths 38 has respective outputs coupled with respective ones of a second subset of the second user link constituent elements 42. The first subset of the first user link constituent elements 42 is a first number of the first user link constituent elements 42, the second subset of the first user link constituent elements 42 is a second number of the first user link constituent elements 42, and the first number is different from the second number. The first subset of the second user link constituent elements 42 is a third number of the second user link constituent elements 42, the second subset of the second user link constituent elements 42 is a fourth number of the second user link constituent elements 42, and the third number is different from the fourth number. In at least one embodiment, a sum of the first number and the second number is equal to a sum of the third number and the fourth number.

The first configuration of the selector subsystem 48 defines a first allocation of capacity between the first user coverage area 14-1 and the second user coverage area 14-2. The second configuration of the selector subsystem 48 defines a second allocation of capacity between the first user coverage area 14-1 and the second user coverage area 14-2, where the second allocation of capacity is different from the first allocation of capacity. The first configuration corresponds to a first beam weight matrix, and the second configuration corresponds to a second beam weight matrix different from the first beam weight matrix. Referring to the beamforming weights 72 depicted in FIG. 1, there may be different sets of beamforming weights 72—different beamforming matrices—corresponding to different capacity allocations between the first and second user coverage areas 14-1 and 14-2.

The first subset of the plurality of first user link constituent elements 42 is configured to transmit a first subset of the plurality of forward composite downlink signals 40 generated by the first subset of the plurality of forward signal paths 38, as transmitted forward composite downlink signals 46. The transmitted first subset of the plurality of forward composite downlink signals 40 superpose to contribute to forming a first user beam—a first forward beam 16—in the first user coverage area 14-1. The second subset of the plurality of second user link constituent elements 42 is configured to transmit a second subset of the plurality of forward composite downlink signals 40 generated by the second subset of the plurality of forward signal paths 38. The transmitted second subset of the plurality of forward composite downlink signals 40 superpose to contribute to forming a second user beam—a second forward beam 16—in the second user coverage area 14-2.

Each of the plurality of forward uplink signals 28 contributes to forming both the first user beam and the second user beam. The first user beam corresponds to first user data streams 62 for a first subset of the plurality of user terminals 12 within the first user coverage area 14-1. Likewise, the second user beam corresponds to second user data streams 62 for a second subset of the plurality of user terminals 12 within the second user coverage area 14-2.

The selector subsystem 48 in one or more embodiments comprises a plurality of forward-link switches coupled to the outputs of the plurality of forward signal paths 38. Each of the plurality of forward-link switches is responsive to the control signals applied to the selector subsystem 48, to selectively couple the respective output of one of the plurality of forward signal paths 38 either to a respective one of the plurality of first user link constituent elements 42 via a first switch state or a respective one of the plurality of second user link constituent elements 42 via a second switch state. Thus, in the first configuration of the selector subsystem 48, a first subset of the plurality of forward-link switches coupled to the respective outputs of the first subset of the plurality of forward signal paths 38 is in the first switch state and a second subset of the plurality of forward-link switches coupled to the respective outputs of the second subset of the plurality of forward signal paths 38 is in the second switch state.

As shown in FIG. 2, the satellite 26 also comprises a plurality of return signal paths, as represented by the transponders 92 shown in the figure. Each of the plurality of return signal paths 92 has a respective output coupled with a respective one of feeds 96 in a feeder link antenna subsystem 98. Switching circuitry 88 is responsive to control signals from the control circuitry 50, to control connectivity between feeds 84 in the first and second user link arrays 86-1 and 86-2 and feeds 96 in the feeder link antenna subsystem 98. For example, in a first configuration of the selector subsystem 88, the selector subsystem 88 controls connectivity between the inputs ends of the transponders 92 and feeds 84 in the first and second user link arrays 86-1 and 86-2, such that a first subset of feeds 84 in the first user link array 86-1 are coupled to respective feeds 96 in the feeder link antenna subsystem 98, to support return beamforming with respect to the first user coverage area 14-1. Further, a second subset of feeds 84 in the second user link array 86-2 are coupled to respective feeds 96 in the feeder link antenna subsystem 98, to support return beamforming with respect to the second user coverage area 14-2.

The foregoing may be understood as allocating first and second subsets of transponders 92 respectively, to the first user coverage area 14-1 and the second user coverage area 14-2, to control the number of return beams used for each such user coverage area 14. For a third user coverage area 14, a third subset of the transponders 92 may be allocated.

Certain components onboard the satellite 26 may be shared between forward and return link communications, e.g., any reflectors included in the respective antenna subsystems may be shared. In one or more embodiments, antenna feeds may be shared. However, in at least one embodiment, the transponders 92 are partially or wholly distinct from the transponders 38.

Items of interest in the ground segment 24 include a beamformer, which is depicted in FIGS. 1 and 2 as the beamformer 68. In fact, the beamformer 68 may comprise a forward beamformer and a return beamformer. For forward beamforming, the beamformer 68 has a forward beam signal input—see the forward beam signals 66 feeding into the beamformer 68 in FIG. 1. Further, the beamformer 68 has a plurality of end-to-end beam-weighted forward uplink signal outputs in communication with the plurality of access nodes 22—see the forward access-node signals 74 in FIG. 1. The end-to-end beam-weighted forward uplink signal outputs correspond to respective weightings of the forward beam signal inputs according to a set of end-to-end forward beam weights provided by the beam weight generator 70. In one or more embodiments, the plurality of access nodes 22 pre-correct the plurality of forward uplink signals 74 to compensate for respective path delays and phase shifts introduced between the plurality of access nodes 22 and the satellite 26.

In at least one embodiment, the selector subsystem 48 dynamically allocates the plurality of forward signal paths 38 among the first user link antenna subsystem 44-1 and the second user link antenna subsystem 44-2, in order to dynamically allocate capacity between the first user coverage area 14-1 and the second user coverage area 14-2.

Figure 3:
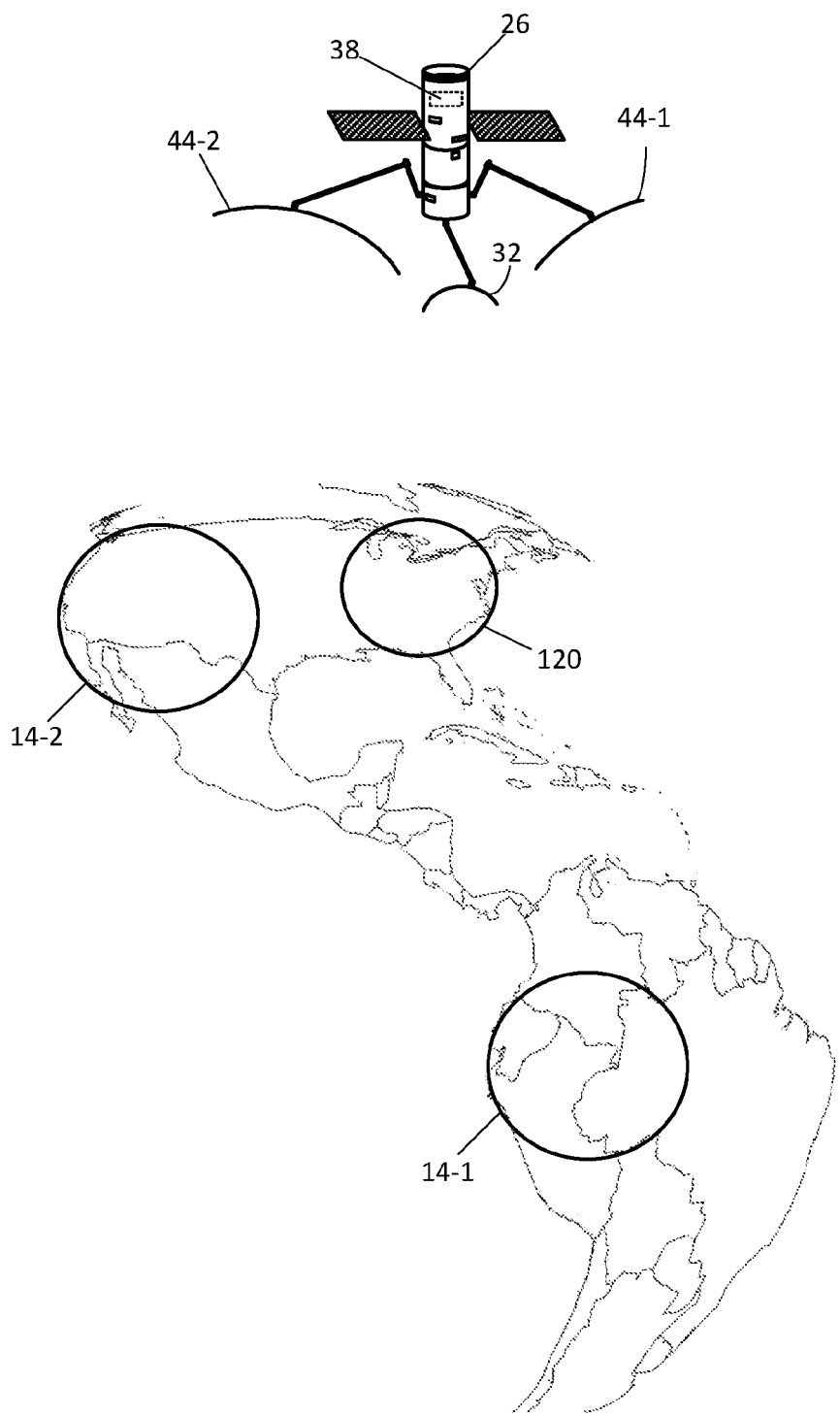
FIG. 3 illustrates an example diagram of a forward link satellite antenna switching scheme that supports end-to-end beamforming with multiple areas of simultaneous user coverage in accordance with aspects of the present disclosure.

FIG. 3 depicts an example implementation of the satellite 26, where the satellite 26 includes transponders 38 configured as forward/return signal paths, some or all of which are dynamically allocable between first and second user coverage areas 14-1 and 14-2, e.g., based on the capacity needs of user terminals 12 operating in the respective user coverage areas 14-1 and 14-2. The satellite 26 includes a first user link antenna subsystem 44-1 that is operative to serve user terminals 12 in the first user coverage area 14-1 in the forward and return directions, i.e., transmit and receive. Further, the satellite 26 includes a second user link antenna subsystem 44-2 that is operative to serve user terminals 12 in the second user coverage area 14-2 in the forward and return directions. Still further, the satellite 26 includes a feeder link antenna subsystem 32 that is operative to communicate—transmit and receive—with a plurality of access nodes 22 in an access node area 120. The respective areas 14-1, 14-2, and 120 are non-overlapping.

Figure 4:
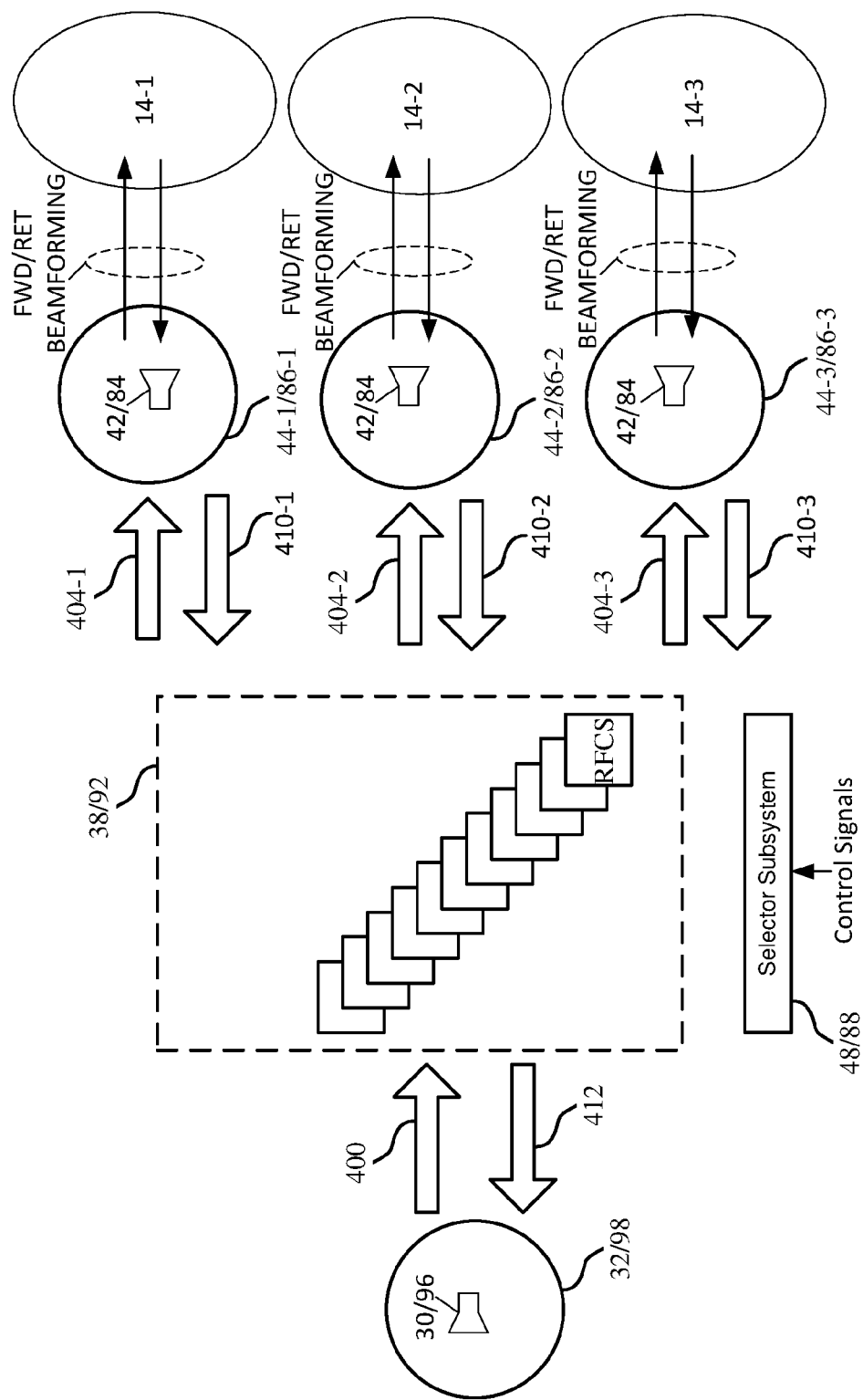
FIG. 4 shows an illustration of an example forward signal path that supports end-to-end beamforming with multiple areas of simultaneous user coverage in accordance with aspects of the present disclosure.

FIG. 4 illustrates example details regarding forward and return signal paths, in an example configuration where the satellite 26 supports simultaneous beamforming with respect to three user coverage areas 14-1, 14-2, and 14-3. A first user link antenna subsystem 44-1 supports beamforming with respect to the first user coverage area 14-1, a second user link antenna subsystem 44-2 supports beamforming with respect to the second user coverage area 14-2, and a third user link antenna subsystem 44-3 supports beamforming with respect to the third user coverage area 14-3.

A point of terminology to note is that the connecting circuitry between the input ends of the forward signal paths or transponders 38 and respective feeds 30 in the feeder link antenna subsystem 32 may be referred to a forward receive paths 400. Similarly, the connecting circuitry between the output ends of the forward signal paths or transponders 38 and respective feeds 42 in the first, second, and third user link antenna subsystems 14-1, 14-2, and 14-3 may be referred to as forward transmit paths 404-1, 404-2, and 404-3. Such circuitry may be part of or coupled with selector circuitry comprised in the selector subsystem 48. That is, individual ones of the forward receive paths 400 and/or individual ones of the forward transmit paths 404-1, 404-2, and 404-3 may be switched to control whether a certain transponder 38 couples to a feed 42 in the first user link antenna subsystem 14-1 or to a feed 42 in the second user link antenna subsystem 14-2 or to a feed 42 in the third user link antenna subsystem 14-3. Also note that the forward signal paths or transponders 38 may comprise groups of Radio Frequency Conversion Stacks (RFCS).

In at least one embodiment, a first subset of transponders 38 is dedicated to the first user link antenna subsystem 44-1, for beamforming with respect to the first user coverage area 14-1, a second subset of transponders 38 is dedicated to the second user link antenna subsystem 44-2, for beamforming with respect to the second user coverage area 14-2, and a third subset of transponders 38 is dedicated to the third user link antenna subsystem 44-3, for beamforming with respect to the third user coverage area 14-3. Individual transponders 38 or groups thereof within a further subset of transponders 38 are allocable to any of the three user coverage areas 14-1, 14-2, and 14-3, in dependence on respective capacity needs in the respective user coverage areas 14.

In at least one embodiment, some or all of the transponders 38 are allocable to any one of the user coverage areas 14 or allocable in any desired ratios to the respective user coverage areas 14. As previously noted, there is a tradeoff between allocability versus complexity and weight of the selector subsystem 48, which comprises, for example, switches or splitters disposed in respective ones of the forward receive paths 400 and/or the forward transmit paths 404-1, 404-2, and 404-3, to control which transponder inputs are switched to which feeds 30 or which transponder outputs are switched to which feeds 42. Thus, while the diagram depicts the selector subsystem 48 as a self-contained entity, it may comprise a distributed set of switches or a switch matrix, or a set of splitters, that control signal pathway connectivity within the satellite 26 responsive to control signals from the control circuitry 50.

In at least one embodiment, the output ends of each transponder 38 among all or a defined subset of the transponders 38 are selectively connectable to a feed 42 in any of the user link antenna subsystems 44. For feeds 42 that are dual polarization, the selector subsystem 48 may also control to which feed port the transponder output connects.

In an example, the satellite 26 has N transponders 38 (e.g., which may be equal to the quantity of forward receive paths 400), and the selector subsystem 48 has N·2 switched outputs, each selectively coupled with a forward transmit path among the forward transmit paths 404-1, 404-2, and 404-3. That is, the quantity of forward transmit paths 404-1, 404-2, and 404-3 may equal N·2. For example, forward transmit paths 404-1 may comprise P_1 transmit paths forward transmit paths 404-2 may comprise P_2 transmit paths, and forward transmit paths 404-3 may comprise P_3 transmit paths, where P_1+P_2+P_3=N·2.

In some embodiments, the quantities of forward transmit paths coupled with respective antenna subsystems may be the same. For example, the satellite 26 may have P_1 transmit paths 404-1 coupled with feeds 42 of a first user link antenna subsystem 44-1 and P_2 transmit paths 404-2 coupled with feeds 42 of a second user link antenna subsystem 44-2, and P_1 may equal P_2. However, the quantities of transmit paths coupled with respective antenna subsystems may be different. For example, a satellite 26 may have P_3 forward transmit paths 404-3 coupled with feeds 42 of the third user link antenna subsystem 44-3, and P_3 may not equal P_1 or P_2 (e.g., P_3 may be less than P_1 and P_2, in some cases). In at least one embodiment, the output ends of one or more of transponders 38 have switches for selectively switching the transponder output into a selected one of the forward transmit paths 404. Such switches may be considered part of the selector subsystem 48 or may be considered part of the respective forward transmit paths and operating under control of the selector subsystem 48.

In some examples, each of the forward transmit paths to an antenna subsystem may be coupled with feeds of the same polarization. For example, each of forward transmit paths 404-1, 404-2, and 404-3 may be coupled with ports of feeds of a single polarization (e.g., RHCP or LHCP). Alternatively, for some antenna subsystems the forward transmit paths may be coupled with ports of feeds of more than a single polarization.

In an example considering only two user link antenna subsystems 44-1 and 44-2, the forward transmit paths 404-1 and 404-2 may be coupled with ports of feeds of multiple polarizations. For example, a first group (e.g., half or P_1/2) feeds of forward transmit paths 404-1 may be coupled with feeds 42 of the first user link antenna subsystem 44-1 of a first polarization (e.g., LHCP), and a second group (e.g., half or P_1/2) feeds of forward transmit paths 404-2 may be coupled with feeds 42 of the first user link antenna subsystem 44-1 of a second polarization (e.g., RHCP). Similarly, a first group (e.g., half or P_2/2) feeds 42 of forward transmit paths 404-2 may be coupled with feeds 42 of the second user link antenna subsystem 42-2 of a first polarization (e.g., LHCP), and a second group (e.g., half or P_2/2) feeds of transmit paths 42-2 may be coupled with feeds 42 of the second user link antenna subsystem 44-2 of a second polarization (e.g., RHCP).

Considering an example context of three user link antenna subsystems 44-1, 44-2, and 44-3 onboard the satellite 26, individual switches of the selector subsystem 48 may be independently configurable (e.g., according to a configuration that may be sent to the satellite 26 via control signaling from the ground segment 24). Thus, from among N transponders 38, S ones of the N transponders 38 may be selectively switched into to S ones of forward transmit paths 404-1, L ones of the N transponders 38 may be selectively switched into L ones of the transmit paths 404-2, and T ones of the N transponders 38 may be selectively switched into T ones of transmit paths 404-3. Here, S is between zero (0) and P_1, L is between zero (0) and P_2, and T is between zero (0) and P_3.

In some examples, a quantity of transmit feeds for each of antennas that are selected using selector subsystem 48 may be determined based on a service capacity associated with each of the respective user coverage areas 14. For example, where a relatively higher capacity is desired in the first user coverage area 14-1 illuminated by the first user link antenna subsystem 44-1, more transmit paths among the forward transmit paths 404-1 may be selected or activated while relatively fewer of ones of the forward transmit paths 404-2 and 404-3 are selected or activated.

Additionally or alternatively, the selection of transmit paths within the groups or sets of forward transmit paths 404-1, 404-2, and 404-3 that are selected may depend on a beamforming configuration for providing the communication service via the respective user coverage areas 14-1, 14-2, and 14-3. For example, respective beamforming configurations may be determined for providing service to each of the user coverage areas 14, and the combinations of the particular feeds 30 and corresponding transponders 38 that are selectively associated with the transmit paths 404-1, 404-2, and 404-3 may be analyzed to determine arrangements of feeds 30 that enhance or optimize the beamforming configurations (e.g., provide higher signal gain for the desired beamforming configurations while reducing or minimizing the amount of parasitic or undesired signal power in areas outside of the desired beamforming configurations).

That is, rather than simply deciding what quantity of transponders 38 to allocate to respective user coverage areas 14-1, the satellite 26 or system 10 at large decides which particular ones of the feeds 30 to associate with respective ones of the user link antenna subsystems 14. There may be certain patterns of feeds allocations that improve beamforming performance. In some examples, capacity demand across a given illumination area for an antenna may be non-uniform, and thus the beamforming configuration and selection of transmit paths may depend on the demand for capacity in areas within the illumination area. For example, where more capacity is desired in one part of the illumination area, more feeds directed to that area may be selected to enhance capacity in that area as compared to other parts of the illumination area. As such, the feed pattern used for beamforming with respect to a particular user coverage area may be based on the distribution of user terminals 12 or needed capacity within the user coverage area.

In some examples, the satellite 26 may be operated according to multiple configurations of forward receive paths 400 and transponders 38 to forward transmit paths 404-1, 404-2, and 404-3. For example, in a first configuration, a first subset of transponders 38 may have outputs (e.g., via selector subsystem 48) coupled with respective feeds 42 of the first user link antenna subsystem 44-1 and a second subset of transponders 38 may have outputs (e.g., via selector subsystem 48) coupled with respective feeds 42 of the second user link antenna subsystem 44-2. The ground segment 24 may apply one or more sets of end-to-end beam weights to forward uplink signals 28 while the satellite 26 is operated in the first configuration to provide one or more sets of forward beams 16 associated with the first user link antenna subsystem 44-1, the second user link antenna subsystem 44-2, and the third user link antenna subsystem 44-3.

In a second configuration, a third subset of transponders 38 may have outputs (e.g., via selector subsystem 48) coupled with respective feeds 42 of the first user link antenna subsystem 44-1 and a fourth subset of transponders 38 may have outputs (e.g., via selector subsystem 48) coupled with respective feeds 42 of the second user link antenna subsystem 44-2. Similarly, the ground network 24 may apply one or more sets of end-to-end beam weights to forward uplink signals 28 while the satellite 26 is operated in the second configuration to provide one or more sets of forward link user beams associated with a first user link antenna subsystem 44-1, or a second user link antenna subsystem 44-2, or a third user link antenna 44-3. In some cases, a sum of the quantity of transponders 38 in the first and second subsets of transponders 38 may be equal to a sum of the quantity of transponders in the third and fourth subsets of transponders 38.

In some cases, a configuration of transponders 38 may be associated with a single polarization for each antenna. For example, for the first configuration, a first subset of transponders 38 may be selected from transponders coupled (e.g., via selector subsystem 48) with ports of feeds 42 of a first user link antenna subsystem 44-1 associated with a first polarization. Similarly, for the first configuration, a second subset of transponders 38 may be selected from transponders coupled (e.g., via selector subsystem 48) with ports of feeds 42 of a second user link antenna subsystem 44-2 associated with the first polarization. Alternatively, for the first configuration, the second subset of transponders 38 may be selected from transponders coupled (e.g., via selector subsystem 48) with respective feeds 42 of the second user link antenna subsystem 44-2 associated with a second polarization.

In some cases, a configuration of transponders 38 may be associated with more than one polarization for at least one antenna. For example, for the first configuration, the first subset of transponders 38 may include transponders coupled (e.g., via selector subsystem 48) with respective feeds of a first antenna associated with both the first and second polarizations. Similarly, for the second configuration, a second subset of transponders 38 may include transponders coupled (e.g., via selector subsystem 48) with respective feeds of a second antenna associated with both the first and second polarizations. In addition, although illustrated and described with selector subsystem 48, selector subsystem 48 may include signal divider elements in place of a subset or all of the described switches. Thus, the output for at least a subset of the transponders 38 may be divided to be provided concurrently to more than one feed of more than one antenna.

FIG. 4 also illustrates example details for return signal pathways or transponders 92 in the satellite 26 that provide for signal flow in the return direction. Return receive pathways 410-1, 410-2, and 410-3 couple feeds 84 in the respective user link antenna subsystems 86-1, 86-2, and 86-3 to input ends of the transponders 92. Output ends of the transponders 92 are coupled to respective feeds 96 in the feeder link antenna subsystem 98. As noted, at least some of the antennal-related elements onboard the satellite 26 may be shared for forward and return communications, e.g., the antenna subsystems used in the forward and return link directions may use the same reflectors.

The switching circuitry 88 operates as a selector subsystem that controls connectivity between feeds 84 in the user link antenna subsystems 86 to feeds 96 in the feeder link antenna subsystem 98, according to the currently configured capacity allocation, which may be updated on a scheduled or commanded basis. The switching may be individually controllable on a per feed/per path basis, as described above for the forward direction, and the same polarization-based connectivity described for the forward direction may be applied in the return direction. Thus, there may be N return transmit paths 412 coupling the return signal pathways or transponders 92 to respective feeds 96 in the feeder link antenna subsystem 98, and there may be N or fewer than N pathways in each of the return receive pathways 410-1, return receive pathways 410-2, and return receive pathways 410-3. The selector subsystem 88 includes or controls switches or splitters that control connectivity between the return signal pathways or transponders 92 and the return receive pathways 410-1, 410-2, and 410-3, meaning that the number and/or pattern of feeds 96 used to serve each of the user coverage areas 14-1, 14-2, and 14-3 in the return direction is dynamically controllable, according to capacity needs or other considerations.

Figure 5:
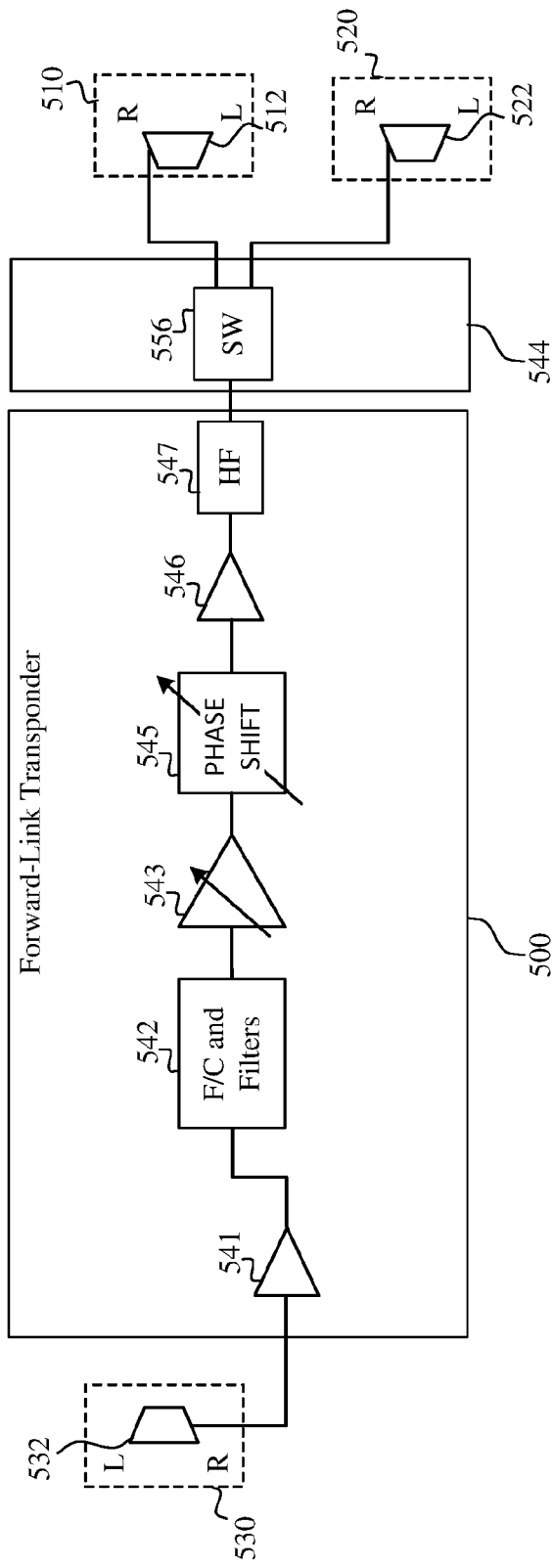
FIG. 5 illustrates an example diagram of a return link satellite antenna switching scheme that supports end-to-end beamforming with multiple areas of simultaneous user coverage in accordance with aspects of the present disclosure.

FIG. 5 illustrates an example forward signal path 500, otherwise referred to as a forward-link transponder 500. The satellite 26 carrying a plurality of such forward signal paths 500 supports end-to-end beamforming with multiple areas of simultaneous user coverage in accordance with aspects of the present disclosure. The forward signal path 500 is an example implementation of any one of the transponders 38 discussed above.

The example forward signal path 500 spans from a feed 532 to a selected one of feed 512 or a feed 522. The feed 532 is one among a plurality of feeds 530, which correspond to the feeds 30 in a feeder link antenna subsystem 32. The feed 512 is one among a first plurality of feeds 510 and corresponds to a feed 42 in a first user link antenna subsystem 44-1. The feed 522 is one among a plurality of second plurality of feeds 520 and corresponds to a feed 42 in a second user link antenna subsystem 44-2.

Connectivity between the input end of the forward signal path 500 and the feed 532 may be regarded as one of the forward receive paths 400 illustrated in FIG. 4. Similarly, switched connectivity from the output end of the forward signal path 500 to the feed 512 may be regarded as one of the forward transmit paths 404-1, and switched connectivity from the output end of the forward signal path 500 to the feed 522 may be regarded as one of the forward transmit paths 404-2.

The respective feeds 510 and 520 are used for transmitting forward downlink signals to user terminals 12 in user coverage areas 14-1 and 14-2, and the feeds 530 are used for receiving forward uplink signals from the plurality of access nodes 22. The forward signal path 500 is allocable therefore either to the first user coverage area 14-1 or the second user coverage area 14-2 by controlling which one of the feeds 512 or 522 is coupled to the output end of the forward signal path 500. That connectivity is controlled by the switch 556 comprised in a selector subsystem 544. The feeds 532, 512 and 522 may be polarized (one or both of LHCP or RHCP) and the selector subsystem 544 may include connectivity control to the selected polarization(s) from/to the feeds 532, 512, and 522.

The forward signal path 500 has a LNA 541 constituting the input end of the forward signal path 500. The forward signal path 500 further includes frequency converters and associated filters 542, channel amplifiers 543, phase shifters 545, power amplifiers 546 (e.g., traveling wave tube amplifiers (TWTAs), solid state power amplifiers (SSPAs), etc.) and harmonic filters 547. Some implementations can have more or fewer components. For example, the frequency converters and associated filters 542 can be useful in cases where the uplink and downlink frequencies are different. As one example, each forward signal path 500 can accept an input at a first frequency range and can output at a second frequency range.

In one or more embodiments, the forward signal path 500 may be coupled with any combination of polarizations, and different groups of forward signal paths 500 onboard the satellite 26 may be coupled to different polarizations. For example, a first group of forward signal paths 500 may have inputs coupled to ports of feeds 532 of a first polarization (e.g., RHCP) and outputs selectively coupled (e.g., via switch 556) to ports of feeds 512, 522 of the same polarization. A second group of forward signal paths 500 may have inputs coupled to ports of feeds 532 associated with the first polarization (e.g., RHCP) and outputs (e.g., via switch 556) coupled to ports of feeds 512, 522 associated with a different polarization (e.g., LHCP).

In some cases, there may be more than two groups of forward signal paths 500 onboard the satellite 26. For example, a plurality of forward signal paths 500 may have their inputs coupled to ports of a first polarization (e.g., RHCP), while different groups may have different polarization assignments for ports of feeds 512 and 522. For example, various configurations for groups include two groups, three groups, or four groups, with each group having a different set of polarizations (e.g., {RHCP, RHCP}, {RHCP, LHCP}, {LHCP, RHCP}, or {LHCP, LHCP}). In addition, where switch 556 has more than two outputs, additional configurations for the groups may be possible, including any combination of polarizations for each group of forward signal paths 500.

Figure 6:
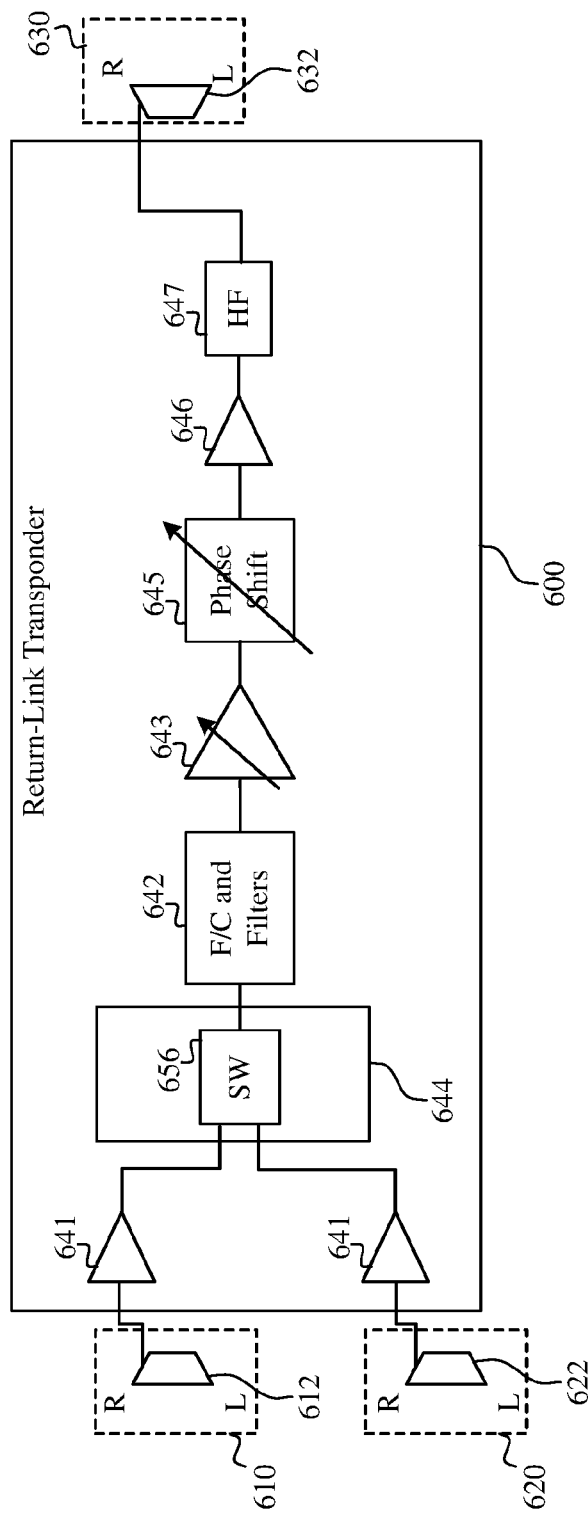
FIG. 6 shows an illustration of an example return signal path that supports end-to-end beamforming with multiple areas of simultaneous user coverage in accordance with aspects of the present disclosure.

FIG. 6 illustrates an example return signal path 600, also referred to as a return-link transponder 600. The return signal path 600 may be understood as an example implementation for the respective transponders 92 depicted in FIG. 2. The satellite 26 carrying a plurality of such return signal paths 600 supports end-to-end beamforming in the return direction with respect to multiple areas of simultaneous user coverage in accordance with aspects of the present disclosure.

The example return signal path 600 couples a selected one of feed 612 or feed 620 to a feed 632. The feed 612 is one among a plurality of feeds 610 and corresponds to a given feed 84 among the feeds 84 comprised in a first user link antenna subsystem 86-1. The feed 622 is one among a plurality of feeds 610 and corresponds to a given feed 84 among the feeds 84 comprised in a second user link antenna subsystem 86-2. The feed 632 is one among a plurality of feeds 630 and corresponds to a given feed 96 among the feeds 96 comprised in a feeder link antenna subsystem 98. In other words, the return signal path 600 is allocable either to the first user link antenna subsystem 86-1 for serving a first user coverage area 14-1 or the second user link antenna subsystem 86-2 for serving a second user coverage area 14-2.

In the context of FIG. 6, then, the respective feeds 610 and 620 are used for receiving return uplink signals from user terminals 12 in user coverage areas 14-1 and 14-2, and the feeds 630 are used for transmitting return downlink signals to the plurality of access nodes 22. The return signal path 600 is allocable either to the first user coverage area 14-1 or the second user coverage area 14-2 by controlling which one of the feeds 612 or 622 is coupled to the input end of the illustrated return link transponder 640. That connectivity is controlled by a switch 656. Although shown as part of the return signal path 600, the switch 656 may be considered to be part of a selector subsystem 644, e.g., as part of the switching circuitry 88 introduced in FIG. 2.

The feeds 612 and 622 may be polarized and may provide one or both of LHCP or RHCP, and the selector subsystem 644 may include connectivity control to the selected polarization(s) from the feeds 612 and 622, e.g., along the lines described above for the forward signal path 500. The return-link transponder 600 includes frequency conversion and filtering circuitry 642, channel amplifiers 643, phase shifters 645, power amplifiers 646 (e.g., traveling wave tube amplifiers (TWTAs), solid state power amplifiers (SSPAs), etc.) and harmonic filters 647. Some implementations can have more or fewer components. For example, the frequency converters and associated filters 642 can be useful in cases where the uplink and downlink frequencies are different. As one example, each return-link transponder 600 can accept an input at a first frequency range and can output at a second frequency range.

Referring back to FIG. 4, connectivity between the input end of the return-link transponder 600 and the feeds 612 and 622 may be understood as respective ones among the return receive paths 410-1 and 410-2. Similarly, connectivity between the output end of the return-link transponder 600 and the feed 632 may be understood as one among the return transmit paths 612.

Figure 7:
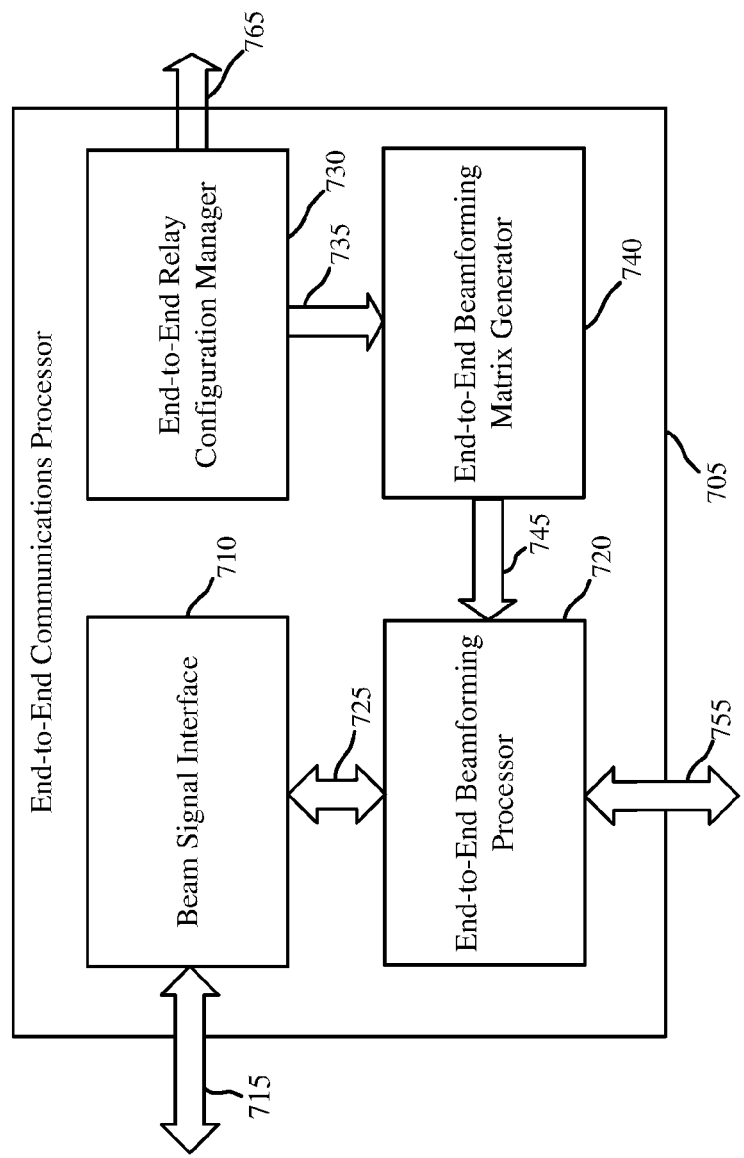
FIG. 7 shows a block diagram of an end-to-end communications processor that supports end-to-end beamforming with multiple areas of simultaneous user coverage in accordance with aspects of the present disclosure.

FIG. 7 is a block diagram of an end-to-end communications processor 705 that supports end-to-end beamforming with multiple areas of simultaneous user coverage in accordance with aspects of the present disclosure. End-to-end communications processor 705 may include beam signal interface 710, end-to-end beamforming processor 720, end-to-end relay configuration manager 730, and end-to-end beamforming matrix generator 740. Each of these modules may communicate, directly or indirectly, with one another (e.g., via one or more buses). End-to-end communications processor 705 may illustrate aspects of network devices 64 depicted in FIG. 1.

The end-to-end communications processor 705 may be configured to provide communications between an access node cluster and multiple user terminals 12 via a satellite 26 acting as an end-to-end relay comprising multiple receive/transmit signal paths. The access node cluster may include multiple access nodes 22 geographically distributed within an access node area 120. The multiple user terminals 12 may be geographically distributed over a first user coverage area 14-1 that is illuminated by a first user link antenna subsystem 44-1 of the satellite 26 and a second user coverage area 14-2 that is illuminated by a second user link antenna subsystem 44-2 of the satellite 26. The satellite 26 has multiple forward signal paths, e.g., forward signal paths 500, where at least some of the forward signal paths 500 are dynamically allocable either to the first user coverage area 14-1 or the second user coverage area 14-2, e.g., to control how many of K forward beams 16 are allocated to first user coverage area 14-1 and how many of the K forward beams 16 are allocated to the second user coverage area 14-2. Of course, there may be three or more user coverage areas 14, and the beam allocation control may be performed across the three or more user coverage areas 14.

For forward-link communications, beam signal interface 710 may receive forward-link beam signals 715 (shown as beam signals 66 in FIG. 1) comprising forward link user data streams 62 for communication to user terminals 12. Beam signal interface 710 may pass the forward-link beam signals to the end-to-end beamforming processor 720 in beam signaling 725.

The end-to-end relay configuration manager 730 may manage configurations of a satellite 26 for end-to-end relaying. For example, the end-to-end relay configuration manager 730 may configure a satellite 26 having multiple antennas and multiple receive/transmit signal paths that may be individually selectively coupled to one of multiple antennas for providing a communications service concurrently to multiple geographic regions. The end-to-end relay configuration manager 730 may configure the end-to-end relay according to one of multiple configurations. For example, for a first configuration of a forward-link, a first subset of the multiple receive/transmit signal paths of the end-to-end relay may be selectively coupled between a first subset of feeds of a first antenna and respective feeds of a first subset of feeds of a second antenna and a second subset of the multiple receive/transmit signal paths of the end-to-end relay may be selectively coupled between a second subset of the feeds of the first antenna and respective feeds of a first subset of feeds of the third antenna. For a second configuration of the forward-link, a third subset of the multiple receive/transmit signal paths of the end-to-end relay may be selectively coupled between a third subset of feeds of the first antenna and respective feeds of a second subset of feeds of the second antenna and a fourth subset of the multiple receive/transmit signal paths of the end-to-end relay may be selectively coupled between a fourth subset of feeds of the first antenna and respective feeds of a second subset of feeds of the third antenna.

The end-to-end relay configuration manager 730 may configure the end-to-end relay by sending control signaling 765 to the end-to-end relay that configures a selector subsystem. The end-to-end relay configuration manager 730 may, for example, determine a distribution of the multiple receive/transmit signal paths of the end-to-end relay selectively coupled with the first antenna and the second antenna for the first configuration based at least in part on a relative throughput demand for the first user coverage area and the second user coverage area. Additionally or alternatively, the end-to-end relay configuration manager 730 may determine the distribution of the multiple receive/transmit signal paths of the end-to-end relay selectively coupled with the first antenna and the second antenna for the first configuration based at least in part on a throughput capability of the access node cluster. The end-to-end relay configuration manager 730 may configure the selector subsystem to switch between multiple configurations. For example, end-to-end relay configuration manager 730 may configure the end-to-end relay in a second configuration where a third subset of the multiple receive/transmit signal paths of the end-to-end relay are selectively coupled between ports of a third subset of feeds of the third antenna and ports of a second subset of feeds of the first antenna and a fourth subset of the multiple receive/transmit signal paths of the end-to-end relay are selectively coupled between ports of a fourth subset of feeds of the third antenna and ports of a second subset of feeds of the second antenna.

In the first configuration, the first subset of feeds of the first antenna may have a first quantity of feeds, and the first subset of feeds of the second antenna may have a second quantity of feeds. In the second configuration, the second subset of feeds of the first antenna may have a third quantity of feeds, and the second subset of feeds of the second antenna may have a fourth quantity of feeds. In some examples, a sum of the first quantity of feeds and the second quantity of feeds is equal to a sum of the third quantity of feeds and the fourth quantity of feeds. A variety of polarization configurations may be selected using the selector subsystem. For example, in the first configuration, each of the first antenna and the second antenna may be used to transmit forward-link signals having the same polarization as the signals received via the third antenna. That is, the ports of the first subset of feeds of the third antenna and the ports of the first subset of feeds of the second antenna may be associated with a first polarization and the ports of the second subset of feeds of the third antenna and the ports of the first subset of feeds of the second antenna may be associated with the first polarization.

Alternatively, in the first configuration, one or more of the first antenna or the second antenna may be used to transmit forward-link signals having a different polarization as the signals received via the third antenna. For example, the ports of the first subset of feeds of the third antenna and the ports of the first subset of feeds of the first antenna may be associated with a first polarization, and the ports of the second subset of feeds of the third antenna may be associated with the first polarization while the ports of the first subset of feeds of the second antenna may be associated with a second polarization.

Similarly, for the second configuration, each of the first antenna and the second antenna may be used to transmit forward-link signals having the same polarization as the signals received via the third antenna, or one or more of the first antenna or the second antenna may be used to transmit forward-link signals having a different polarization as the signals received via the third antenna. Additionally or alternatively, for either of the first or second configurations, either or both of the first antenna or the second antenna may be used to transmit forward-link signals having multiple polarizations. For example, for the first configuration or the second configuration, the subset of receive/transmit signal paths that are coupled with the first antenna or the second antenna may be coupled with ports of feeds of the antenna of multiple polarizations. Thus, the communications service may be provided using a single polarization on the forward uplink with one or more polarizations for each of the antennas concurrently illuminating multiple coverage areas for the forward downlink.

End-to-end relay configuration manager 730 may also configure the selector subsystem to switch between multiple return-link configurations. For example, for a first return-link configuration, a third subset of the multiple receive/transmit signal paths of the end-to-end relay may be selectively coupled between ports of a second subset of feeds of the first antenna and ports of a third subset of feeds of the third antenna and a fourth subset of the multiple receive/transmit signal paths of the end-to-end relay may be selectively coupled between ports of a second subset of feeds of the second antenna and ports of a fourth subset of feeds of the third antenna. One or more additional return-link configurations may include inputs of different subsets of the multiple receive/transmit signal paths of the end-to-end relay selectively coupled between different arrangements of feeds of the first antenna, second antenna, and third antenna.

In some examples, the end-to-end relay configuration manager 730 may determine a distribution of the multiple receive/transmit signal paths of the end-to-end relay selectively coupled with the first antenna and the second antenna for the first configuration (e.g., for forward-link or return-link) based at least in part on a relative throughput demand for the first user coverage area and the second user coverage area. In some examples, the end-to-end relay configuration manager 730 may determine a distribution of the multiple receive/transmit signal paths of the end-to-end relay selectively coupled with the first antenna and the second antenna for the first configuration based at least in part on a throughput capability of the access node cluster. In some examples, capacity demand across a given illumination area for an antenna may be non-uniform, and thus the beamforming configuration and selection of transmit paths may depend on the demand for capacity in areas within the illumination area. For example, where more capacity is desired in one part of the illumination area, more feeds directed to that area may be selected to enhance capacity in that area as compared to other parts of the illumination area. The end-to-end relay configuration manager 730 may provide the configuration of receive/transmit signal paths 735 to the end-to-end beamforming matrix generator 740. The configuration of receive/transmit signal paths 735 may include, for example, a first forward link beam weight matrix for the first configuration and a second forward link beam weight matrix for the second configuration.

The end-to-end beamforming matrix generator 740 may generate beamforming matrices 745 for forward-link and return-link communications via an end-to-end relay having multiple antennas concurrently illuminating multiple coverage areas. For example, end-to-end beamforming matrix generator 740 may identify, for the first configuration, a first forward link beam weight matrix for end-to-end beamforming of transmissions from the plurality of access nodes to the plurality of user terminals via the end-to-end relay. The end-to-end beamforming matrix generator 740 may identify additional forward link beam weight matrices for the first configuration. For example, the end-to-end beamforming matrix generator 740 may identify a first set of forward link beam weight matrices for the first configuration, and the end-to-end beamforming processor 720 may apply one or more of the first set of forward link beam weight matrices (e.g., cycling through at least a subset of the first set of forward link beam weight matrices, or selecting one or more of the first set of forward link beam weight matrices based on factors such as demand within the various beams). In addition, the end-to-end beamforming matrix generator 740 may identify, for the second configuration, a second forward link beam weight matrix for end-to-end beamforming of transmissions from the plurality of access nodes to the plurality of user terminals via the end-to-end relay. The forward-link and return-link beamforming matrices may be generated based on the configuration of receive/transmit signal paths 735 (e.g., forward-link or return-link) determined by the end-to-end relay configuration manager 730. The end-to-end beamforming matrix generator 740 may identify additional forward-link or return-link beam weight matrices for the second configuration. For example, the end-to-end beamforming matrix generator 740 may identify a second set of forward-link beam weight matrices for the second configuration, and the end-to-end beamforming processor 720 may apply one or more of the second set of forward-link beam weight matrices (e.g., cycling through at least a subset of the second set of forward-link beam weight matrices, or selecting one or more of the second set of forward-link beam weight matrices based on factors such as demand within the various beams). The end-to-end relay configuration manager 730 may determine additional configurations of the multiple receive/transmit signal paths of the end-to-end relay, and the end-to-end beamforming matrix generator 740 may identify additional sets of forward-link or return-link beam weight matrices for the additional configurations.

The end-to-end beamforming processor 720 may receive the beamforming matrices 745 and apply the beamforming matrices 745 for forward-link and return-link signals to obtain or process access node-specific signals 755. For example, end-to-end beamforming processor 720 may generate a first set of respective access node-specific forward link signals for transmission by the plurality of access nodes, each of the respective access node-specific forward link signals comprising a composite of respective forward link beam signals of at least a subset of the first set of forward link beam signals weighted by respective forward beamforming weights according to the first forward link beam weight matrix for the first configuration. The end-to-end beamforming processor 720 may apply the beamforming matrices for forward-link and return-link signals for additional time periods using the same or different beamforming matrices for the first configuration. In addition, the end-to-end beamforming processor 720 may generate a second set of respective access node-specific forward link beam signals for transmission by the plurality of access nodes, each of the second set of respective access node-specific forward link signals comprising a composite of respective forward link beam signals of the second set of forward link beam signals weighted by respective forward link beamforming weights according to the second forward link beam weight matrix for the second configuration.

In addition, the end-to-end beamforming processor 720 may apply the return link beam weight matrix to respective return link signals received at the plurality of access nodes to obtain respective return link data streams associated with the first and second subsets of the plurality of user terminals. The end-to-end beamforming processor 720 may apply the beamforming matrices for forward-link and return-link signals for additional time periods using the same or different beamforming matrices for the second configuration. Each of the respective return link signals may comprise a composite of signals relayed by at least one of the third subset of the multiple receive/transmit signal paths of the end-to-end relay and at least one of the fourth subset of the multiple receive/transmit signal paths of the end-to-end relay.

Figure 8:
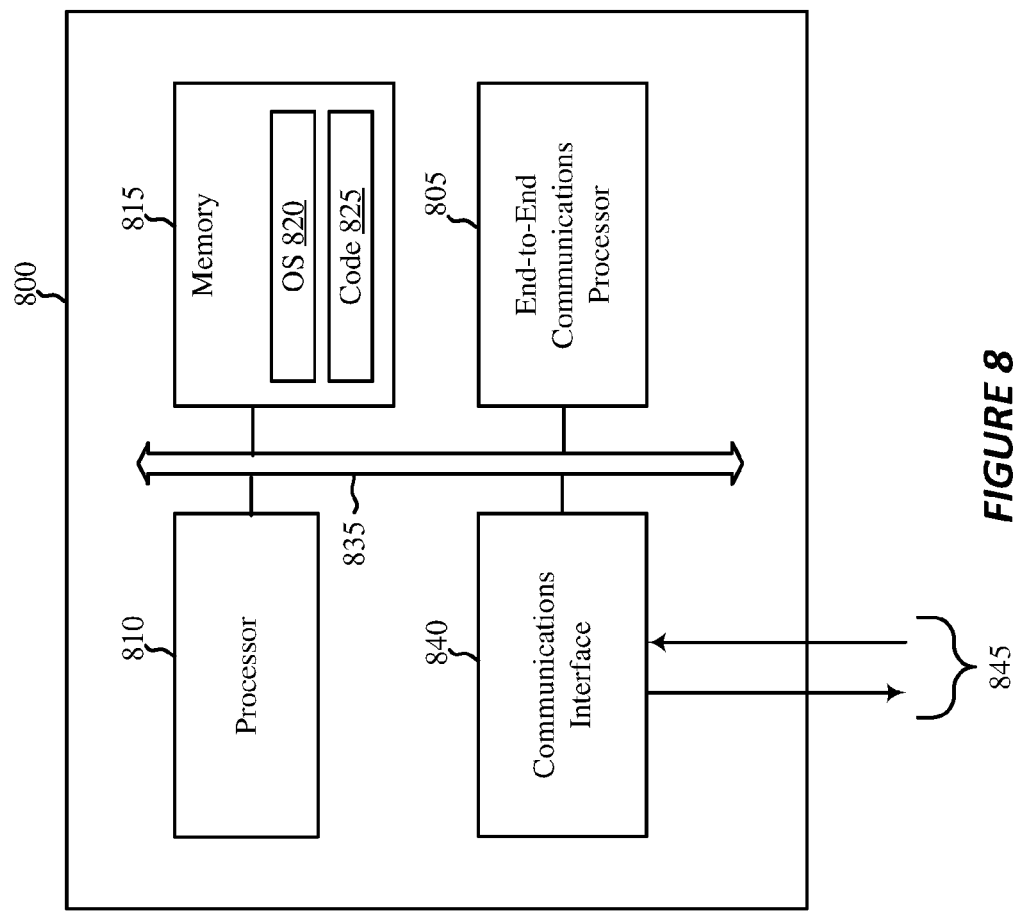
FIG. 8 shows a block diagram of a controller that supports end-to-end beamforming with multiple areas of simultaneous user coverage in accordance with aspects of the present disclosure.

FIG. 8 is a block diagram of a controller 800 according to an example embodiment. The controller 800 supports end-to-end beamforming with multiple areas of simultaneous user coverage in accordance with aspects of the present disclosure. The controller 800 may include an end-to-end communications processor 805, a processor 810, memory 815, and a communications interface 840. Each of these components may be in communication with each other, directly or indirectly, over one or more buses 835. The controller 800 may be implemented in one of the network devices 64 of the ground segment 24 or may be implemented in the satellite 26 or may be distributed between the ground segment 24 and the satellite 26.

The memory 815 may include random access memory (RAM) and/or read-only memory (ROM). The memory 815 may store an operating system (OS) 820 (e.g., built on a Linux or Windows kernel). The memory 815 may also store computer-readable, computer-executable code 825 including instructions that are configured to, when executed, cause the processor 810 to perform various functions described herein related to providing communications services according to different native antenna patterns. Alternatively, the code 825 may not be directly executable by the processor 810 but be configured to cause the controller 800 (e.g., when compiled and executed) to perform one or more of the functions described herein.

The controller 800 may include end-to-end communications processor 805, which may manage one or more aspects of a communications satellite for supporting end-to-end beamforming with multiple areas of simultaneous user coverage, as described herein. Communications services may, for example, be provided via the communications interface 840.

The controller 800, including the end-to-end communications processor 805 operating as communications service manager, the processor 810, the memory 815, and/or the communications interface 840 may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. The controller 800 may also be implemented as a combination of computing devices, e.g., a combination of a DSP and a microprocessor, multiple microprocessors, one or more microprocessors in conjunction with a DSP core, integrated memory, discrete memory, or any other such configuration.

Figure 9:
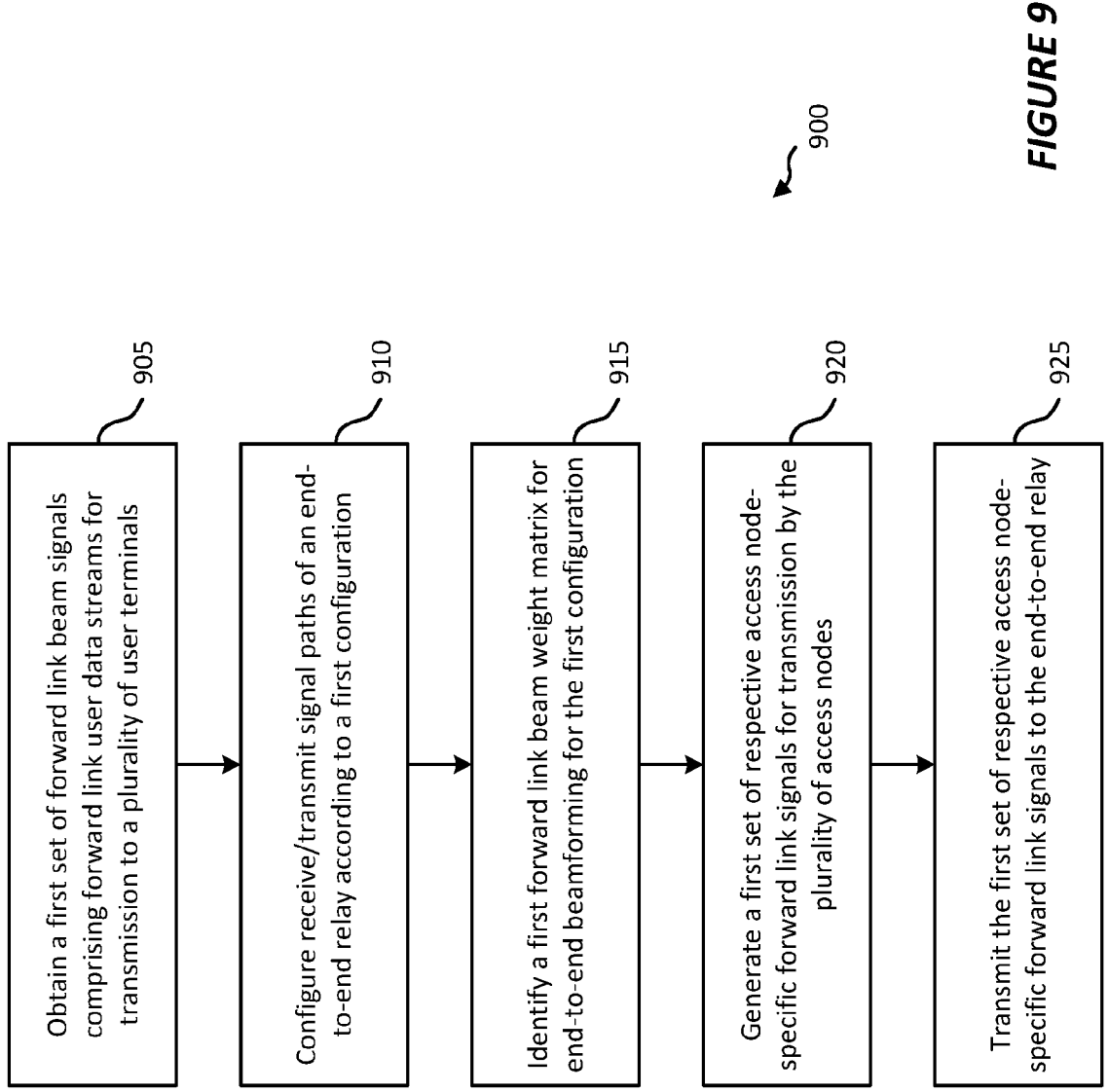
FIG. 9 shows a flowchart of an example method that supports end-to-end beamforming with multiple areas of simultaneous user coverage in accordance with aspects of the present disclosure.

FIG. 9 is flowchart of an example method 900 that supports end-to-end beamforming with multiple areas of simultaneous user coverage in accordance with aspects of the present disclosure. The operations of the method 900 may be implemented by a controller for a communications satellite including multiple antennas or its components as described herein. In some examples, a controller may execute a set of instructions to control the functional elements of the controller to perform the functions described below. Additionally or alternatively, a controller may perform aspects of the functions described below using special-purpose hardware.

The method 900 may provide communications between an access node cluster and a plurality of user terminals via an end-to-end relay comprising multiple receive/transmit signal paths, where the access node cluster comprises a plurality of access nodes geographically distributed within an access node area, the plurality of user terminals are geographically distributed over a first user coverage area illuminated by a first antenna and a second user coverage area illuminated by a second antenna, and the multiple receive/transmit signal paths of the end-to-end relay have inputs coupled with feeds of a third antenna illuminating the access node area and outputs that are individually selectable between the first antenna and the second antenna.

At 905, the controller may obtain a first set of forward link beam signals comprising forward link user data streams for transmission to the plurality of user terminals.

At 910, the controller may configure, for a first configuration, a first subset of the multiple receive/transmit signal paths of the end-to-end relay to be selectively coupled between ports of a first subset of feeds of the third antenna and ports of a first subset of feeds of the first antenna and a second subset of the multiple receive/transmit signal paths of the end-to-end relay to be selectively coupled between ports of a second subset of the feeds of the third antenna and ports of a first subset of feeds of the second antenna. The ports of the first subset of feeds of the third antenna and the ports of the first subset of feeds of the second antenna may be associated with a first polarization, and the ports of the second subset of feeds of the third antenna and the ports of the first subset of feeds of the second antenna may be associated with the first polarization. Alternatively, the ports of the first subset of feeds of the third antenna and the ports of the first subset of feeds of the first antenna may be associated with a first polarization, and the ports of the second subset of feeds of the third antenna may be associated with the first polarization and the ports of the first subset of feeds of the second antenna may be associated with a second polarization.

A distribution of the multiple receive/transmit signal paths of the end-to-end relay selectively coupled with the first antenna and the second antenna for the first configuration may be determined based at least in part on a relative throughput demand for the first user coverage area and the second user coverage area. A distribution of the multiple receive/transmit signal paths of the end-to-end relay selectively coupled with the first antenna and the second antenna for the first configuration may be determined based at least in part on a throughput capability of the access node cluster.

At 915, the controller may identify, for the first configuration, a first forward link beam weight matrix for end-to-end beamforming of transmissions from the plurality of access nodes to the plurality of user terminals via the end-to-end relay. The controller may identify additional forward link beam weight matrices for the first configuration.

At 920, the controller may generate a first set of respective access node-specific forward link signals for transmission by the plurality of access nodes, each of the respective access node-specific forward link signals comprising a composite of respective forward link beam signals of at least a subset of the first set of forward link beam signals weighted by respective forward beamforming weights according to the first forward link beam weight matrix for the first configuration. The controller may generate additional sets of respective access node-specific forward link signals for additional time periods, using the first forward link beam weight matrix or additional forward link beam weight matrices.

At 925, the plurality of access nodes may transmit the first set of respective access node-specific forward link signals to the end-to-end relay. The receive/transmit signal paths of the end-to-end relay may relay the first set of respective access node-specific forward link signals to form beams within the first user coverage area and the second user coverage area concurrently.

Thus, method 900 may support end-to-end beamforming with multiple areas of simultaneous user coverage. It should be noted that method 900 discusses exemplary implementations and that the operations of method 900 may be rearranged or otherwise modified such that other implementations are possible. For example, certain described operations may be optional (e.g., those enclosed by boxes having dashed lines, those described as optional, etc.), where optional operations may be performed when certain criteria are met, performed based on a configuration, omitted intermittently, omitted entirely, etc.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, multiple microprocessors, microprocessors in conjunction with a DSP core, or any other such configuration.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the term "coupled," when referring to electrical signal paths or nodes, refers to electrically connected, whether directly or indirectly. Additionally, the term "selectively coupled," when referring to electrical signal paths or nodes, refers to nodes that are connected, directly or indirectly, via one or more selectable elements such as switches, which couple the "selectively coupled" signal paths or nodes, and may isolate one or more of the nodes from alternative nodes or signal paths.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

This disclosure is provided to enable a person skilled in the art to make or use the subject matter claimed herein. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. A method of operation by a satellite communications system that includes a plurality of geographically distributed access nodes and includes a satellite having a plurality of forward signal paths, the method comprising:

transmitting to the satellite from the plurality of access nodes during each of two or more scheduled intervals, each access node transmitting a respective one among a plurality of forward uplink signals, with each forward signal path relaying a respective superposition of the plurality of forward uplink signals as a corresponding forward downlink signal, and wherein superpositions of the plurality of forward downlink signals form a plurality of simultaneous forward beams in dependence on a beam weight matrix used to form the plurality of forward uplink signals, the beam weight matrix comprising end-to-end forward beam weights; and for each scheduling interval:
determining forward signal path allocations with respect to non-overlapping first and second user coverage areas, the forward signal path allocations allocating a non-zero first subset of the forward signal paths to the first user coverage area, and allocating a non-zero second subset of the forward signal paths to the second user coverage area;

controlling connectivity for the plurality of forward signal paths according to the forward signal path allocations, with output ends of the first subset of the forward signal paths switched into connection with respective feeds of a first user link array that is configured for illuminating the first user coverage area, and with output ends of the second subset of the forward signal paths switched into connection with respective feeds of a second user link array that is configured for illuminating the second user coverage area; and computing the beam weight matrix for use during the scheduling interval based on end-to-end forward channels corresponding to the forward signal path allocations.

2. The method according to claim 1, wherein each user coverage area is divided into a predetermined pattern of beam coverage areas, and wherein computing the beam weight matrix for use during each scheduling interval comprises computing the beam weight matrix in dependence on which beam coverage areas are to be illuminated in each user coverage area during the scheduling interval.

3. The method according to claim 2, wherein each beam coverage area encompasses a geographic location representing a desired beam center, wherein the satellite communications system receives sounding signals from respective reference user terminals (RUTs) located at or near the respective geographic locations, and wherein the method includes estimating the end-to-end forward channels from the received sounding signals.

4. The method according to claim 1, wherein each forward signal path has an input end connected to a respective feed in a feeder link array, with the output end of each forward signal path being switchable between a respective feed in the first user link array and a respective feed in the second user link array, and wherein determining the forward signal path allocations includes determining which feed patterns to use for simultaneous beamforming into the first and second user coverage areas, in dependence on respective distributions of user terminals in the first and second user coverage areas, the feed patterns dictating which ones among the forward signal paths are included in the first subset and which ones among the forward signal paths are included in the second subset.

5. The method according to claim 1, wherein the forward signal path allocations change over two or more of the scheduling intervals, according to changing determinations of capacity needs between the first and second user coverage areas.

6. The method according to claim 1, wherein controlling the connectivity for the plurality of forward signal paths according to the forward signal path allocations comprises providing the satellite with a schedule indicating the forward signal path allocations to use for a plurality of scheduled intervals, and wherein the satellite has onboard switching circuitry operative to switch the output ends of the forward signal paths according to the schedule.

7. The method according to claim 1, wherein controlling the connectivity for the plurality of the forward signal paths according to the forward signal path allocations comprises transmitting commands to the satellite, to control switching circuitry of the satellite that is operative to switch the output ends of the forward signal paths.

8. A satellite communications system comprising:
a satellite having a plurality of forward signal paths;
a plurality of geographically distributed access nodes included in a ground segment of the satellite communications network and configured for transmitting to the satellite during each of two or more scheduled intervals, each access node transmitting a respective one among a plurality of forward uplink signals, with each forward signal path relaying a respective superposition of the plurality of forward uplink signals as a corresponding forward downlink signal, and wherein superpositions of the plurality of forward downlink signals form a plurality of simultaneous forward beams in dependence on a beam weight matrix used to form the plurality of forward uplink signals, the beam weight matrix comprising end-to-end forward beam weights; and a controller further included in the ground segment of the satellite communications network, the controller comprising a communications interface and one or more processors configured to:
determine forward signal path allocations with respect to each scheduling interval, the forward signal path allocations in each scheduling interval determined with respect to non-overlapping first and second user coverage areas and allocating a non-zero first subset of the forward signal paths to the first user coverage area, and allocating a non-zero second subset of the forward signal paths to the second user coverage area;
control connectivity of the forward signal paths according to the beam allocations determined for each scheduling interval, such that, with respect to the first and second subsets of the forward signal paths determined for each scheduling interval, output ends of the first subset of the forward signal paths are switched into connection with respective feeds of a first user link array that is configured for illuminating the first user coverage area, and output ends of the second subset of the forward signal paths are switched into connection with respective feeds of a second user link array that is configured for illuminating the second user coverage area; and
compute the beam weight matrix for use during each scheduling interval based on end-to-end forward channels corresponding to the forward signal path allocations determined for each scheduling interval.

9. The satellite communications system according to claim 8, wherein each user coverage area is divided into a predetermined pattern of beam coverage areas, and wherein the controller is configured to compute the beam weight matrix for use during each scheduling interval in dependence on which beam coverage areas are to be illuminated in each user coverage area during the scheduling interval.

10. The satellite communications system according to claim 9, wherein each beam coverage area encompasses a geographic location representing a desired beam center, wherein the satellite communications system receives sounding signals from respective reference user terminals (RUTs) located at or near the respective geographic locations, and wherein the controller is configured to estimate the end-to-end forward channels from the received sounding signals.

11. The satellite communications system according to claim 8, wherein each forward signal path has an input end connected to a respective feed in a feeder link array, with the output end of each forward signal path being switchable between a respective feed in the first user link array and a respective feed in the second user link array, and wherein, as part of determining the forward signal path allocations, the controller is configured to determine which feed patterns to use for simultaneous beamforming into the first and second user coverage areas, in dependence on respective distributions of user terminals in the first and second user coverage areas, and wherein the feed patterns dictating which ones among the forward signal paths are included in the first subset and which ones among the forward signal paths are included in the second subset.

12. The satellite communications system according to claim 8, wherein the forward signal path allocations change over two or more of the scheduling intervals, according to changing determinations of capacity needs between the first and second user coverage areas.

13. The satellite communications system according to claim 8, wherein the controller is configured to control the connectivity for the plurality of forward signal paths based on providing the satellite with a schedule indicating the forward signal path allocations to use for a plurality of scheduled intervals, and wherein the satellite has onboard switching circuitry operative to switch the output ends of the forward signal paths according to the schedule.

14. The satellite communications system according to claim 8, wherein the controller is configured to control the connectivity for the forward signal paths by transmitting commands to the satellite, to control switching circuitry of the satellite that is operative to switch the output ends of the forward signal paths according to the commands.

* * * * *